US010267945B2

(12) United States Patent
Omeragic

(10) Patent No.: US 10,267,945 B2
(45) Date of Patent: Apr. 23, 2019

(54) USE OF TRANSVERSE ANTENNA MEASUREMENTS FOR CASING AND PIPE DETECTION

(71) Applicant: Schlumberger Technology Corporation, Sugar Land, TX (US)

(72) Inventor: Dzevat Omeragic, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 303 days.

(21) Appl. No.: 14/887,136

(22) Filed: Oct. 19, 2015

(65) Prior Publication Data
US 2016/0116624 A1    Apr. 28, 2016

Related U.S. Application Data

(60) Provisional application No. 62/066,292, filed on Oct. 20, 2014.

(51) Int. Cl.
*E21B 47/022* (2012.01)
*G01V 3/28* (2006.01)
(52) U.S. Cl.
CPC .............. *G01V 3/28* (2013.01); *E21B 47/022* (2013.01)
(58) Field of Classification Search
CPC ................................ E21B 47/022; G01V 3/28
See application file for complete search history.

(56) References Cited

U.S. PATENT DOCUMENTS

| 4,593,770 A | 6/1986 | Hoehn, Jr. |
| 4,791,373 A | 12/1988 | Kuckes |
| 5,131,477 A | 7/1992 | Stagg et al. |
| 5,218,301 A | 6/1993 | Kuckes |
| 5,258,755 A | 11/1993 | Kuckes |
| 5,657,826 A | 8/1997 | Kuckes |
| 5,676,212 A | 10/1997 | Kuckes |
| 5,960,370 A | 9/1999 | Towle et al. |
| 6,736,222 B2 | 5/2004 | Kuckes et al. |
| 6,814,163 B2 | 11/2004 | Kuckes |
| 6,998,844 B2 | 2/2006 | Omeragic et al. |
| 7,219,749 B2 | 5/2007 | Kuckes |
| 7,321,293 B2 | 1/2008 | Kennedy et al. |

(Continued)

OTHER PUBLICATIONS

International Search Report issued in related PCT application PCT/US2015/056328 dated Jan. 14, 2016, 3 pages.

*Primary Examiner* — Jermele M Hollington
*Assistant Examiner* — Feba Pothen

(57) ABSTRACT

Disclosed herein is a method of determining a relation between a resistivity logging tool and casing in an earth formation. The method includes acquiring coupling voltages for different tool face angles, between different antenna components of different axes of a transmitting station transmitting into the earth formation and different antenna components of different axes of a receiving station receiving from the formation, using the resistivity logging tool. Then, spatial Fourier coefficients are extracted from the coupling voltages, using a computing device associated with the resistivity logging tool. The relation between the resistivity logging tool and the casing is then determined as a function of the spatial Fourier coefficients and at least one resistivity measurement of the earth formation, using the computing device.

20 Claims, 26 Drawing Sheets

(56) References Cited

U.S. PATENT DOCUMENTS

| | | | |
|---|---|---|---|
| 7,382,135 B2* | 6/2008 | Li | G01V 3/28 324/338 |
| 7,510,030 B2 | 3/2009 | Kuckes et al. | |
| 7,568,532 B2 | 8/2009 | Kuckes et al. | |
| 8,063,641 B2 | 11/2011 | Clark et al. | |
| 8,289,024 B2 | 10/2012 | Clark et al. | |
| 8,307,915 B2 | 11/2012 | Clark et al. | |
| 8,347,985 B2 | 1/2013 | Bittar et al. | |
| 8,462,012 B2 | 6/2013 | Clark et al. | |
| 8,800,684 B2 | 8/2014 | Krueger et al. | |
| 2006/0195264 A1 | 8/2006 | Galil El Askary | |
| 2006/0217889 A1* | 9/2006 | Burtz | G01V 3/083 702/7 |
| 2010/0182004 A1 | 7/2010 | Prammer | |
| 2011/0308794 A1 | 12/2011 | Bittar et al. | |
| 2012/0283952 A1 | 11/2012 | Tang et al. | |
| 2013/0154650 A1 | 6/2013 | Bittar et al. | |
| 2013/0191028 A1* | 7/2013 | Homan | G01V 3/28 702/7 |
| 2013/0311094 A1 | 11/2013 | Donderici et al. | |
| 2014/0107929 A1* | 4/2014 | Zhong | E21B 47/02216 702/7 |
| 2014/0191879 A1* | 7/2014 | Bittar | E21B 43/2406 340/854.1 |

* cited by examiner

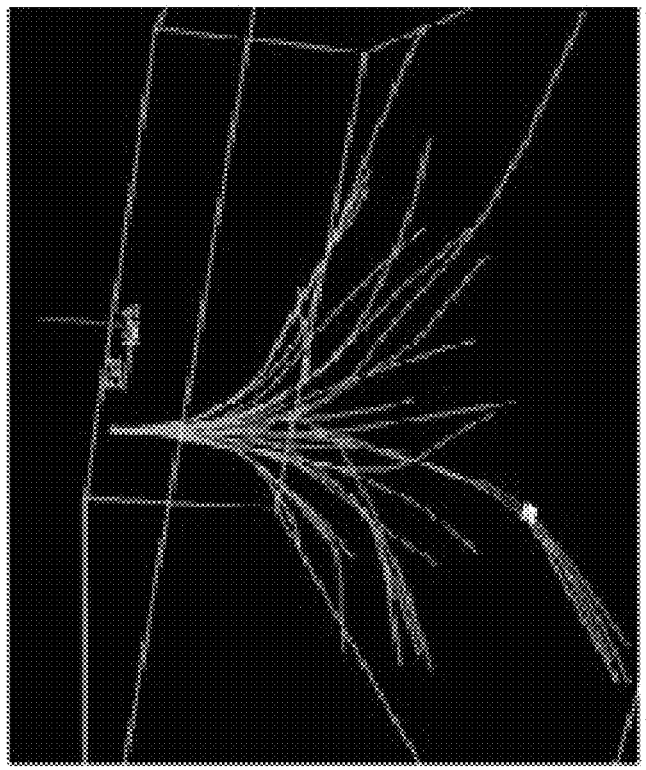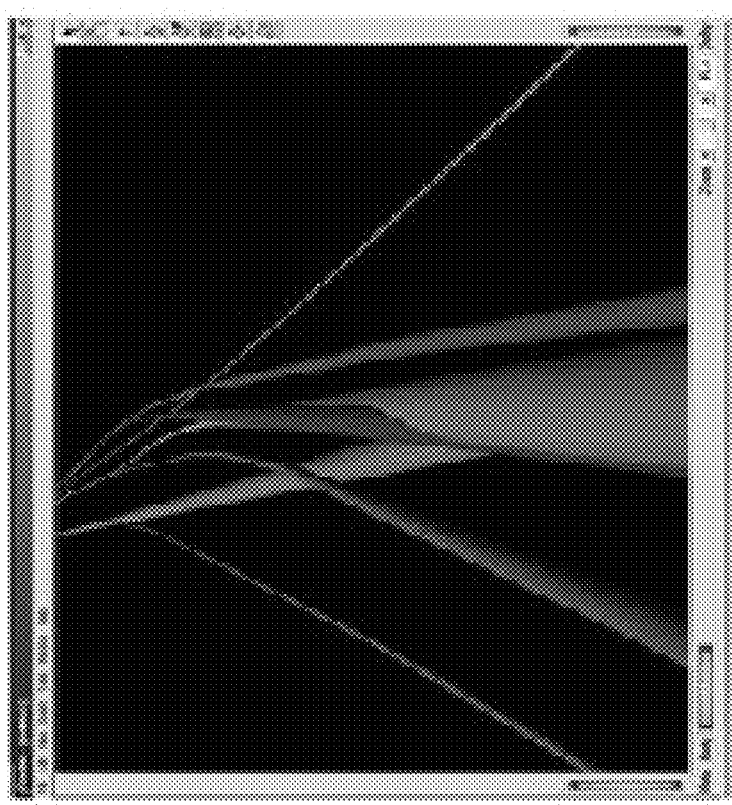
FIG. 6

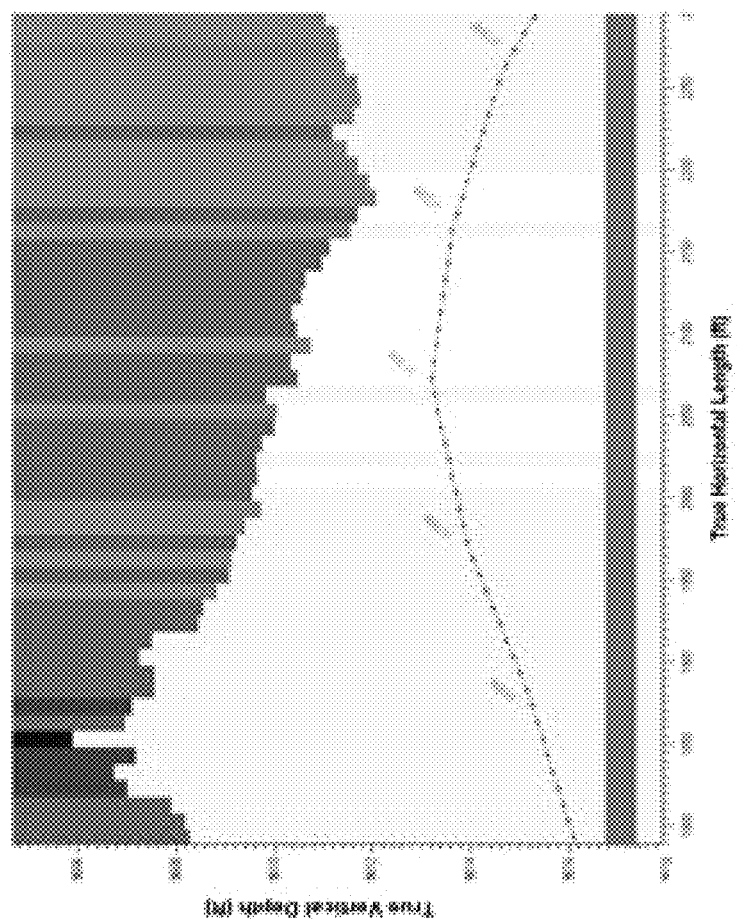
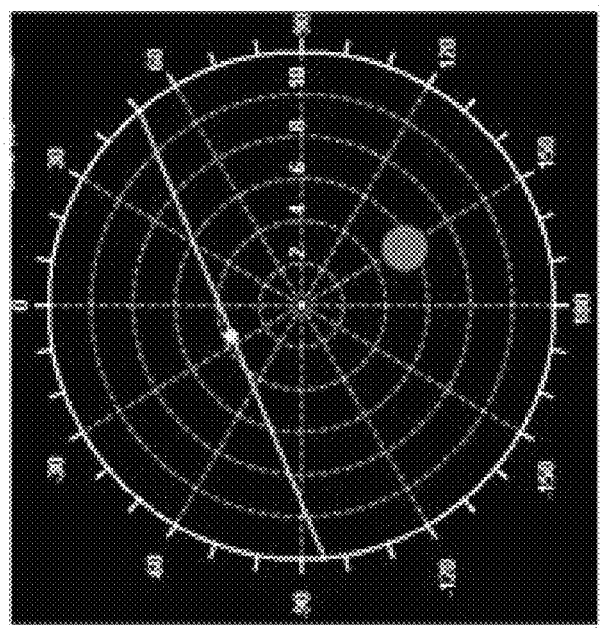
FIG. 7

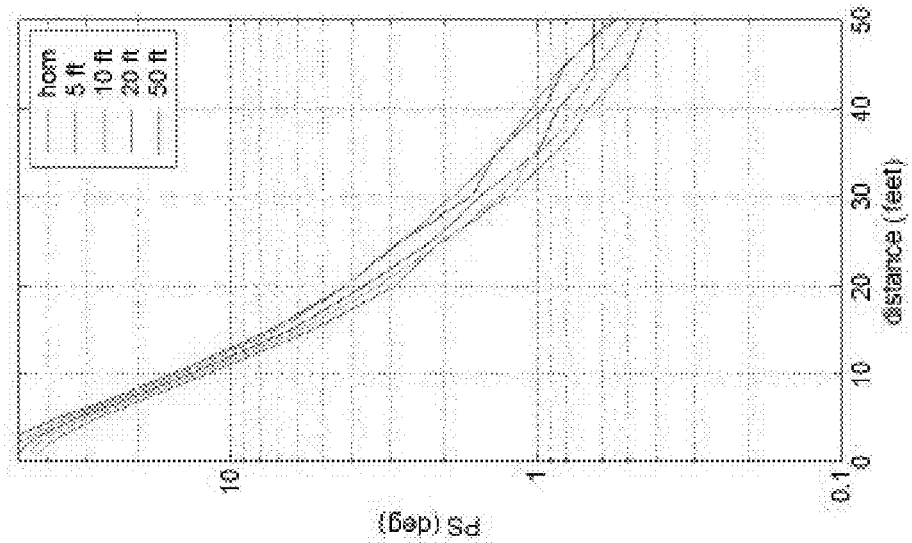
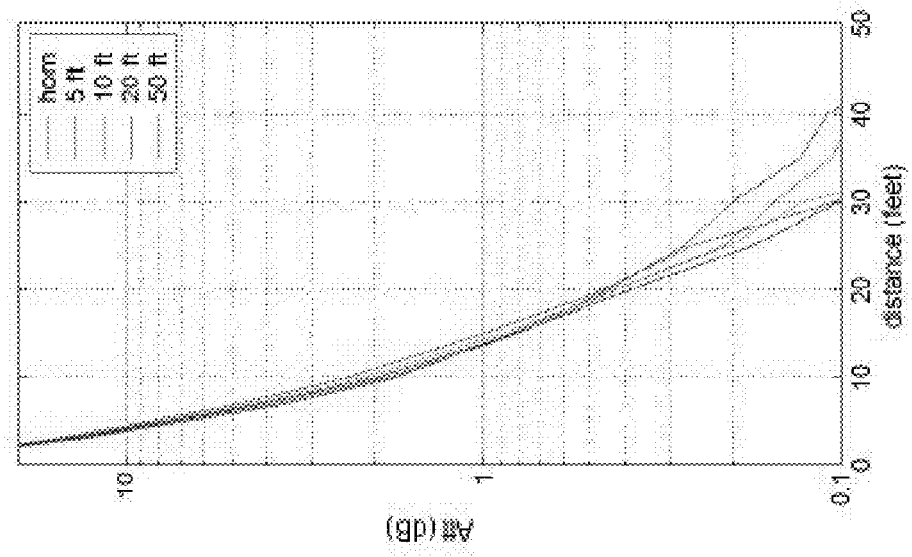
FIG. 23

USE OF TRANSVERSE ANTENNA MEASUREMENTS FOR CASING AND PIPE DETECTION

CROSS REFERENCE TO RELATED APPLICATIONS

This application claims the benefit and priority of U.S. App. No. 62/066,292, titled "USE OF TRANSVERSE ANTENNA MEASUREMENTS FOR CASING AND PIPE DETECTION" and filed Oct. 20, 2014, the contents of which are hereby incorporated in their entirety.

TECHNICAL FIELD

This disclosure is related to the field of well logging, and, in particular, to methods of detecting casing and pipe from data collected using resistivity logging tools.

BACKGROUND

Detection of a nearby cased well, evaluating the distance from it, and its direction are important for steering with respect to a cased well or for collision avoidance. Steam assisted gravity drainage (SAGD) is such an application, where an injector well is drilled at a given distance parallel to a cased producer well. For collision avoidance applications, the objective is to detect the casings in order to avoid these wells. That is particularly useful for drilling new wells out of offshore platforms where the density of existing wells could be high.

A commonly used technique for evaluating formations surrounding an earth borehole is resistivity logging. A porous formation having a high resistivity generally indicates the presence of hydrocarbons, while a porous formation with low resistivity generally indicates water saturation, for example. Modern resistivity logging tools operate by transmitting a signal from a transmitter station and measuring the voltage of the received signal at a receiver station. These voltages are referred to as coupling voltages and are sensitive to the formation properties.

Such modern resistivity logging tools are already used in logging while drilling applications. Thus, ways to utilize resistivity logging tools to detect nearby cased wells would be particularly desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a method of determining a relation between a multi-component resistivity logging tool and casing in an earth formation. The method includes acquiring coupling voltages for different tool face angles, between different antenna components of different axes of a transmitting station transmitting into the earth formation and different antenna components of different axes of a receiving station receiving from the formation, using the resistivity logging tool. Then since the tool is rotating while acquiring receiver measurements and toolface measurements, spatial Fourier coefficients can be extracted from the coupling voltages, using a computing device associated with the multi-component resistivity logging tool. The relation between the multi-component resistivity logging tool and the casing is then determined as a function of the spatial Fourier coefficients and at least one resistivity measurement of the earth formation, using the computing device.

Another aspect is directed to a well logging tool. The well logging tool includes a resistivity sub which has at least one transmitter station with a plurality of transmission antenna components each corresponding to a different axis and transmitting into an earth formation, and at least one receiver station with a plurality of reception antenna components each corresponding to a different axis and receiving from the earth formation. A control apparatus for the resistivity sub is configured to operate the resistivity sub so as to acquire coupling voltages, for different tool face angles, between the at least one transmitter station and the at least one receiver station. The control apparatus is also configured to extract spatial Fourier coefficients from the coupling voltages, and determine the relation between the resistivity sub and casing in the earth formation as a function of the spatial Fourier coefficients and at least one resistivity measurement of the earth formation.

Another aspect is directed to the use of the techniques described above to a tensor resistivity tool conveyed on a wireline.

BRIEF DESCRIPTION OF THE DRAWINGS

FIG. 6 is a joint interpretation of distance to nearby boundaries and casings based on model-based inversion.

FIG. 7 is another joint interpretation of distance to nearby boundaries and casings, based on model-based inversion.

FIG. 23 shows 2 kHz directional attenuation measurement responses to casing with the presence of a nearby boundary above the casing.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

The techniques described herein are to be performed using resistivity logging tools. Various embodiments of the present disclosure are directed to use of transverse magnetic dipole (TMD) antenna couplings, second order propagation measurements, and crossed-TMD couplings from induction measurements to detect the presence of nearby cased wells, and to ultimately estimate the position and direction of the cased wells for an arbitrary resistivity background and mud type. These techniques may be for single well applications that may be utilizing while drilling systems. Ratios of effective transverse magnetic dipole couplings and second harmonic directional measurements are proposed for casing interception and anti-collision applications while drilling.

In casing interception, these measurements are applicable at various well inclinations, with wells drilled at various relative angles with respect to the target cased wells. To interpret the measurements, a model-based inversion can be used in some embodiments, and depending on measurements used (spacing and frequencies), the parameterization may use background formation in order to determine the distance to the target cased well (position) and the casing orientation. For anti-collision applications, the well is drilled to avoid getting too close to or hitting nearby wells by steering based on monitoring of the second harmonic measurements and the effective angle.

In one mode, the low frequency measurements are used and selected based on background lowest resistivity so the measurements are minimally sensitive to background formation heterogeneities.

Figure 1:
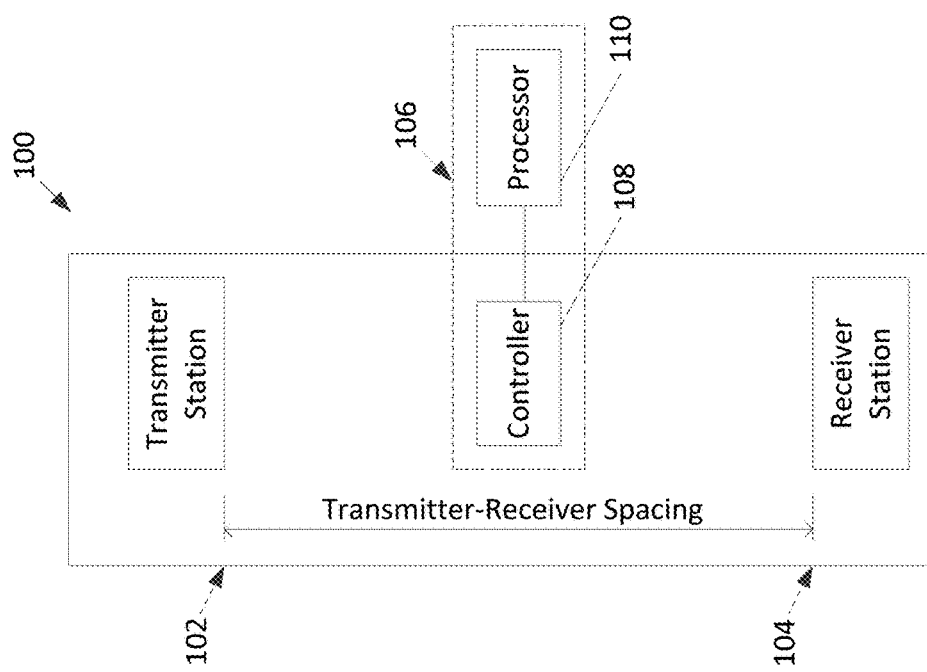
FIG. 1 is a schematic block diagram of a resistivity logging tool which may be used to perform the techniques described herein.

With reference to FIG. 1, a resistivity logging tool 100 which may be utilized in performing the techniques described herein is now described. The resistivity logging tool 100 includes a transmitter station 102 and a receiver station 104. The transmitter station 102 and the receiver station 104 each include tilted antenna coils or axially oriented antenna coils. There may be multiple antenna coils in each of the transmitter station 102 and receiver station 104 arranged along different axes. The tool 100 also includes a controller 108 that operates the transmitter station 102 to transmit a signal from its coils and measures the voltage of the received signals at the coils of the receiver station 104. The voltages of the received signals will be referred to herein as coupling voltages. An optional processor 110 may be external to, but associated with, the resistivity logging tool 100. The controller 108 and processor 110 may be collectively referred to as a computing device 106, and descriptions of tasks performed by the computing device 106 may be performed by either the controller 108 or processor 110.

The controller 108 and/or processor 110 may each include microprocessors. Alternatively or additionally, the controller 108 and/or processor 110 may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices instead of microprocessors.

The antenna coil or coils of the transmitter station 102 may be tilted, while the antenna coil or coils of the receiver station 104 may be tilted or nearly in the same plane as the tilted transmitter so as the response can be resolved into an Vxx which has a second harmonic coefficient when fit to a Fourier expansion or fit. The transmitter could also be a co-located triaxial antenna, that is an X, Y, and Z directed antennas. Thus one would measure $$V(TF) = \begin{pmatrix} V_{xx} & V_{xy} & V_{xz} \\ V_{yx} & V_{yy} & V_{yz} \\ V_{zx} & V_{zy} & V_{zz} \end{pmatrix}$$

matrix directly versus toolface.

The resistivity tool 100 may be included in a drill string and used while drilling, or may be conveyed by other means (e.g. wireline) and used at times when drilling is not being conducted. In the wireline case the tensor resistivity matrix would be rotated and minimized to find the angle between the tool coordinate and the casing.

Figure 2:
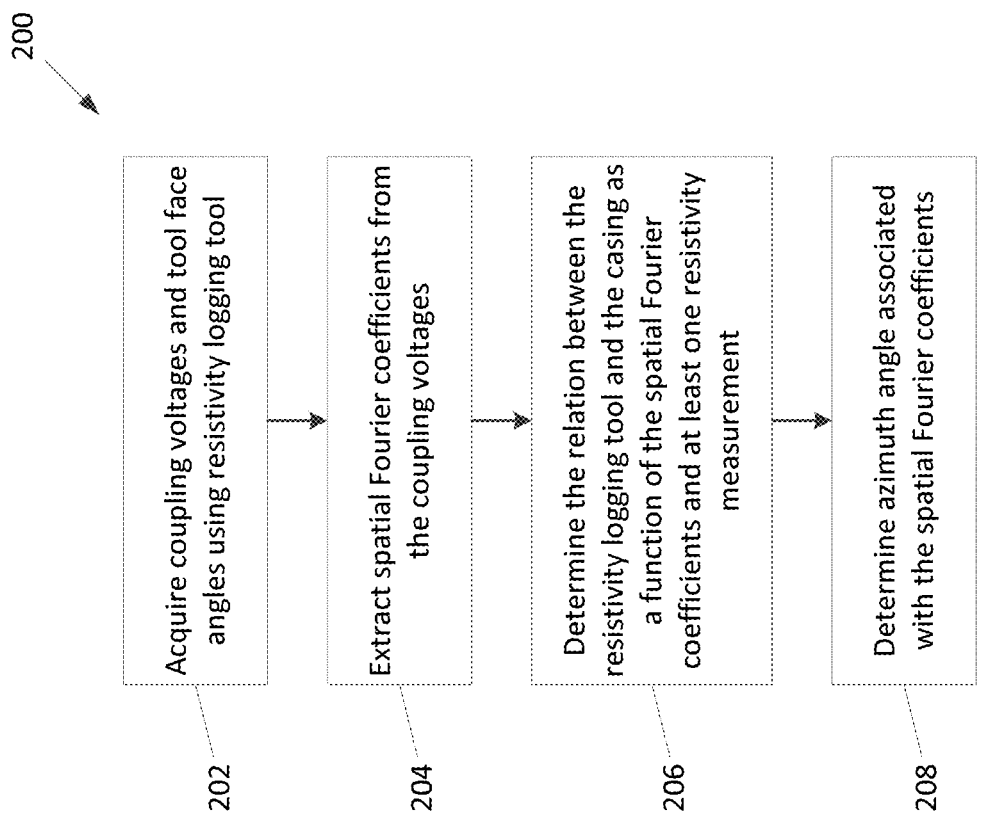
FIG. 2 is a flowchart of a method of determining a relation between a resistivity logging tool and casing in an earth formation.

With reference to the flowchart 200 of FIG. 2, a method of determining a relation between the resistivity logging tool 100 and casing in an earth formation is now described. The resistivity tool 100 is operated by the computing device 106 to acquire coupling voltages between different antenna components aligned with different axes of the transmitting station 102 transmitting into the earth formation and different antenna components of different axes of the receiving station 104 receiving from the earth formation (Block 202).

Figure 3:
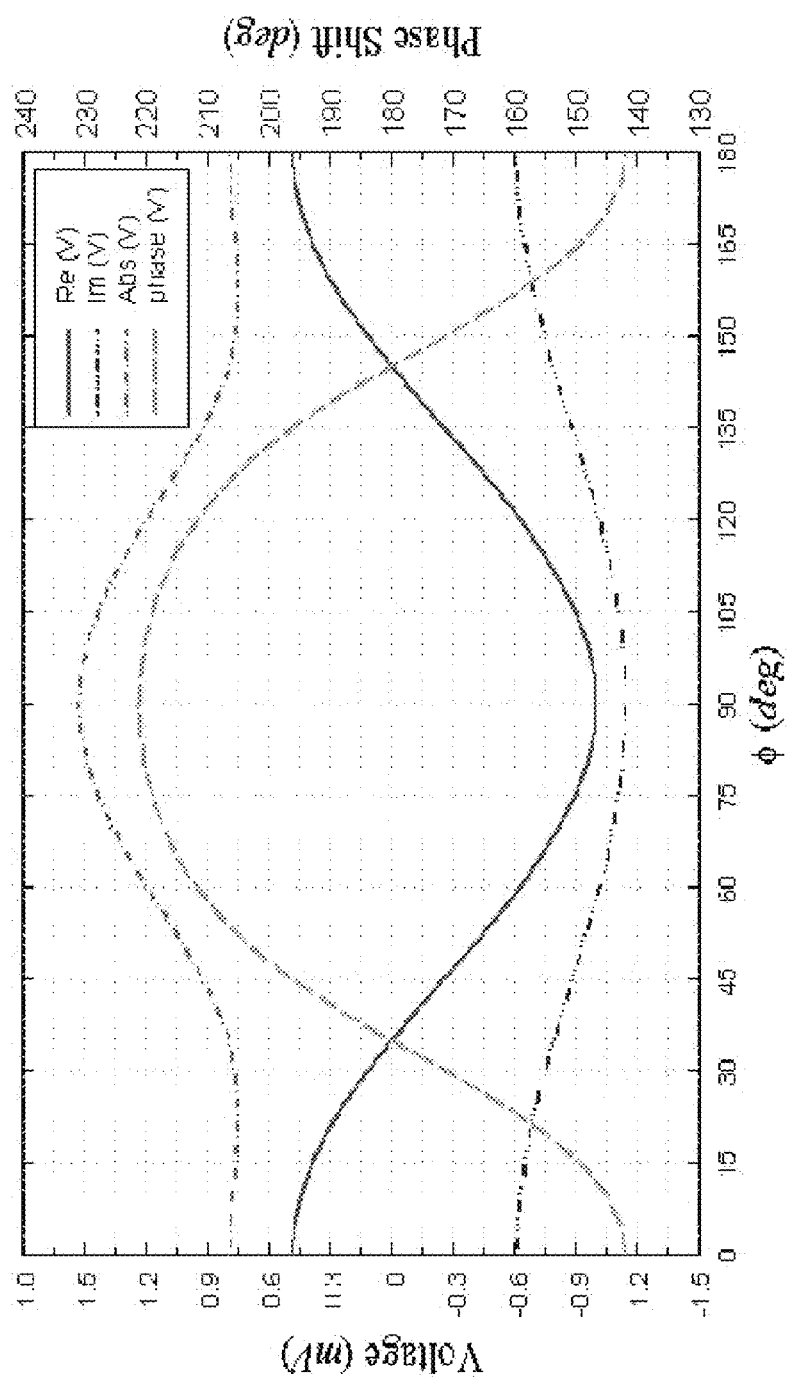
FIG. 3 illustrates the response of a transverse coil pair, such as may be included in the resistivity logging tool of FIG. 1, to casing, with the angle $\phi$ being measured with respect to the casing.

Then, spatial Fourier coefficients are extracted from coupling voltages versus tool face angles, using the computing device 106 (Block 204). Basic response of a transverse coil pair to casing (similarly to boundaries or fractures) is shown in FIG. 3. The azimuth angle is measured from a direction perpendicular to a casing-tool plane, and since this coupling has cos(2θ) sensitivity, responses are shown on the interval 0-180°. It should be noted that both real and imaginary voltage components peak when coils are oriented 90 deg from the casing (magnetic dipoles are perpendicular to plane defined by nearby casing and the tool position). When the tool is oriented so the TMD antenna points towards the casing, there is no current induced in the casing that couples with the formation currents.

Stated another way, second harmonic directional measurements are obtained from the TMD couplings by extracting spatial Fourier coefficients, as done for fracture detection and evaluation.

The second harmonic measurements are the ratio of the coupling voltages at 90 degrees to the coupling voltages at 0 (or 180) degrees. Mathematically, this can be represented as: $\ln(V_{90}/V_0)=\ln(V_{XX}/V_{YY})$.

These second harmonic measurements can be obtained from fitting coefficients. For given channel (frequency, transmitter, receiver) voltage measurement, a fitting algorithm is used to produce coefficients $a_{RE\ i}$, $b_{RE\ i}$, $a_{IM\ i}$, $b_{IM\ i}$.

$$\text{Re}\{V(f,t,r)\} = a_{RE0} + \sum_{k=1}^{N}\{a_{REk}\cos(k\phi) + b_{REk}\sin(k\phi)\} \quad (1)$$

$$\text{Im}\{V(f,t,r)\} = a_{IM0} + \sum_{k=1}^{N}\{a_{IMk}\cos(k\phi) + b_{IMk}\sin(k\phi)\}$$

Figure 4:
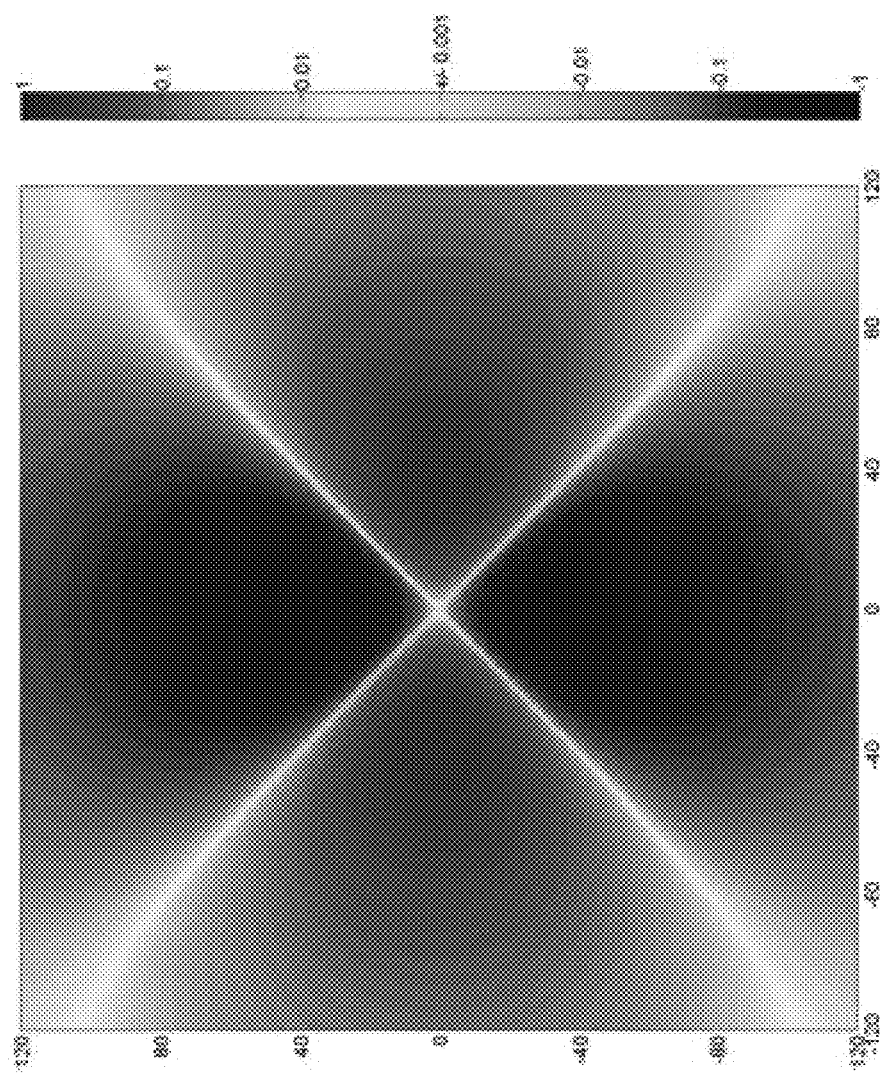
FIG. 4 illustrates the second harmonic measurement spatial sensitivity in the perpendicular planes at the mid-point.

Spatial sensitivity in a plane perpendicular to tool is shown in FIG. 4.

Casing orientation can be obtained by averaging values from the real and imaginary part of voltage second harmonic.

$$\phi_2(f,t,r) = \frac{1}{4}\left(\tan^{-1}\frac{b_{RE2}}{a_{RE2}} + \tan^{-1}\frac{b_{IM2}}{a_{IM2}}\right) \quad (2)$$

or using the Stokes parameter definition $$\phi = \frac{1}{4}\tan^{-1}\frac{V_{yx}V_{xy}^* + V_{xy}V_{yx}^*}{|V_{yx}|^2 - |V_{xy}|^2} \quad (3)$$

Note that for each individual component, there is ½ in front of $\tan^{-1}$ because the second harmonic is being utilized.

Next, the computing device 106 determines the relation between the resistivity logging tool and the casing as a function of the spatial Fourier coefficients and at least one resistivity measurement of the earth formation (Block 206). This may be done by executing an inversion loop receiving the spatial Fourier coefficients and at least one resistivity measurement as inputs. The resistivity measurement is of resistivity of the earth formation local to the casing and may be from a priori knowledge, or may be taken using a separate resistivity logging tool on the same tool string as the resistivity logging tool 100. This relation may be distance to the casing.

Figure 5:
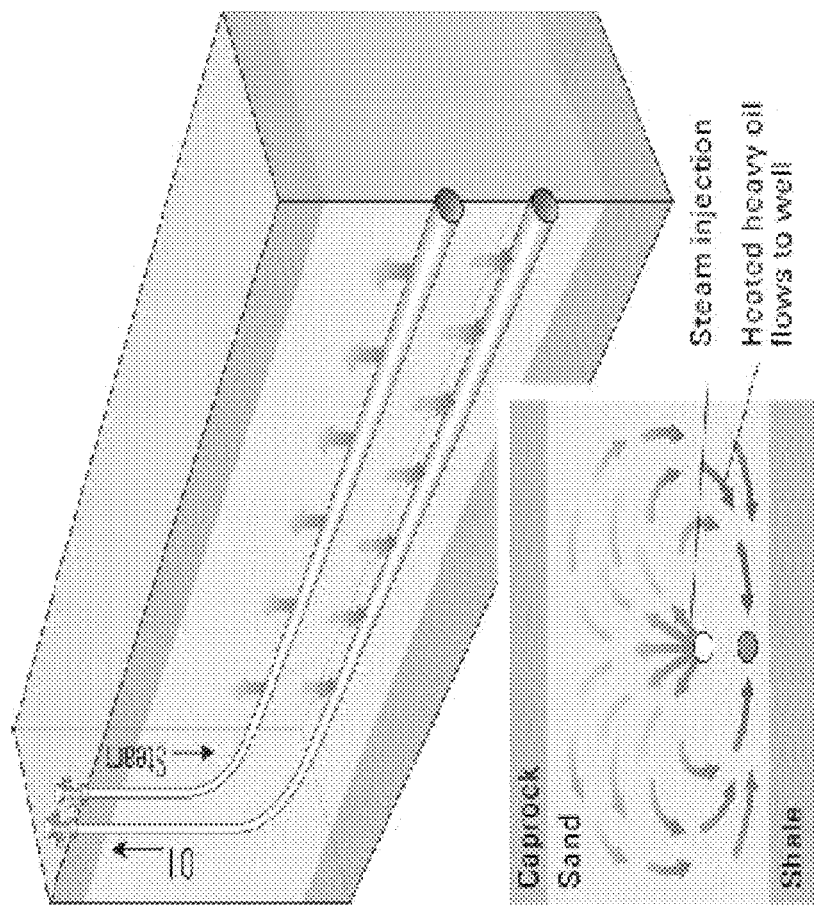
FIG. 5 illustrates horizontal wells drilled in stacked pairs form the basic unit of a steam-assisted gravity drainage project.

Illustrated in FIG. 5 are horizontal wells drilled in stacked pairs forming a basic unit of a steam-assisted gravity drainage (SAGD) project. Steam injected into the upper well melts surrounding oil, while gravity causes the mobilized oil to flow downward to the lower cased well, where the oil is produced to surface. SAGD well pairs can be drilled to track depositional features or in patterns for optimal recovery, such as at the distance of about 15 feet (5 meter). When drilling is performed for these applications, an azimuth angle associated with the second harmonic measurements. This azimuth angle points toward the length of casing that is closer to the resistivity logging tool. The drill string may be steered based upon the azimuth angle and the distance to the casing.

Illustrated in FIG. 6 is the joint interpretation of distance to nearby boundaries and casings based on model-based inversion. This is performed by forming a model of the earth formation as a function of symmetrized and anti-symmetrized directional measurements and the at least one resistivity measurement of the earth formation either known as a priori knowledge or taken using another logging tool in the tool string, and then fitting the spatial Fourier coefficients to the model.

The second harmonic measurements are sensitive to asymmetry in the formation, not just to nearby casing. In certain scenarios and when the casing is further away, the nearby boundary or anisotropy of the formation can induce a signal that is comparable to nearby casing signal. At the same time the azimuth angle from these couplings is affected and points in direction that could be different from both orientation of the layering and nearby casing azimuth. In such scenarios it is helpful to first find the formation resistivity profile locally and then use that as a background and determine the distance and azimuth of the casing.

Figure 8:
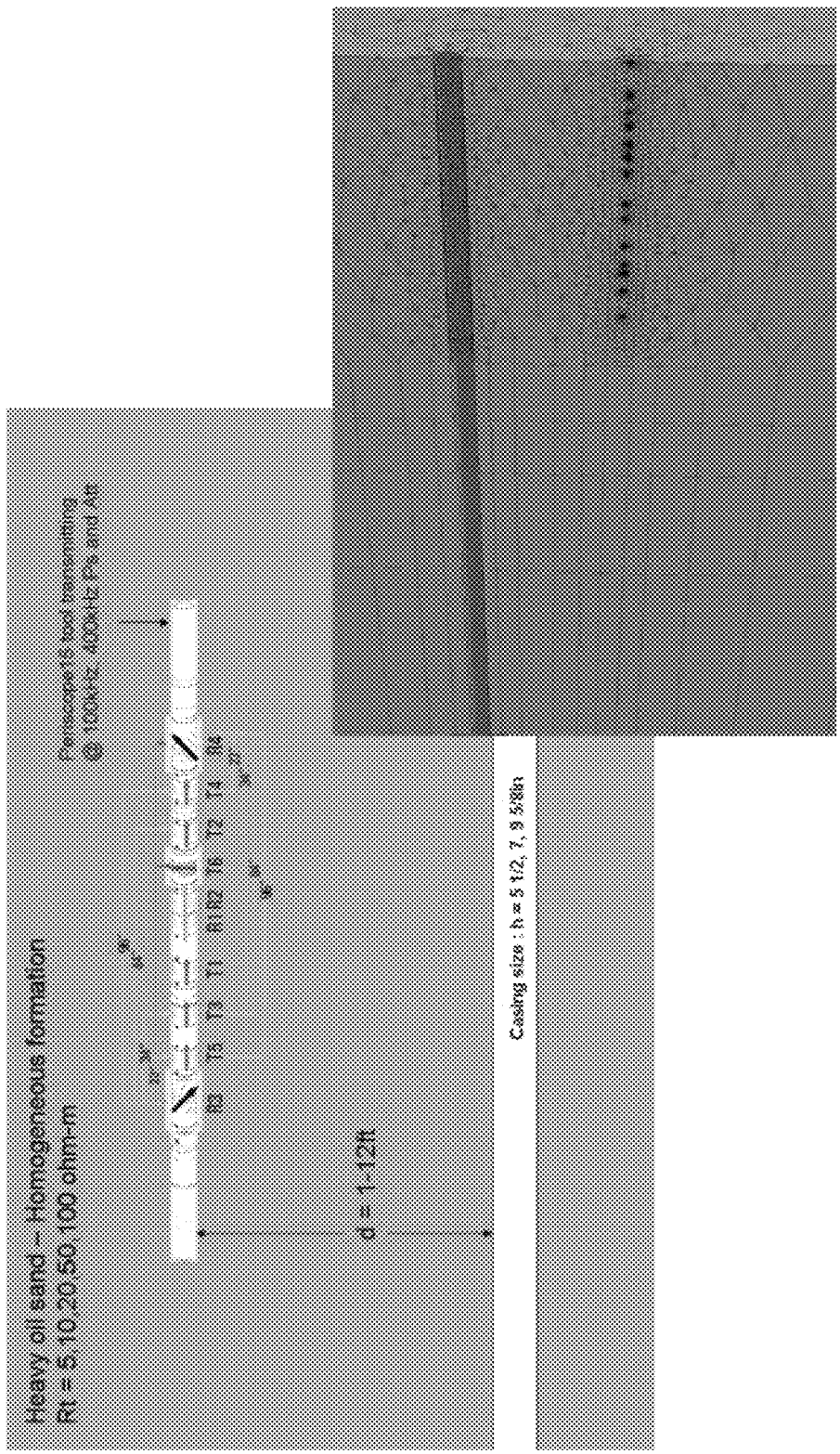
FIG. 8 shows modeling of directional measurement response to casing.

In the proximity of the casing, conventional first harmonic directional and resistivity measurements are used to find boundaries and resistivity distribution. FIG. 7 illustrates the application and decoupling of casing and boundary signals through model based inversion. To verify these results, the inventor has performed modeling on an electromagnetic logging while drilling (LWD) measurement tool responses to casing parallel or with some angle (inclination and azimuth with respect to nearby casing). The modeling was done using finite element 3D modeling software, as shown in FIG. 8.

Figure 9:
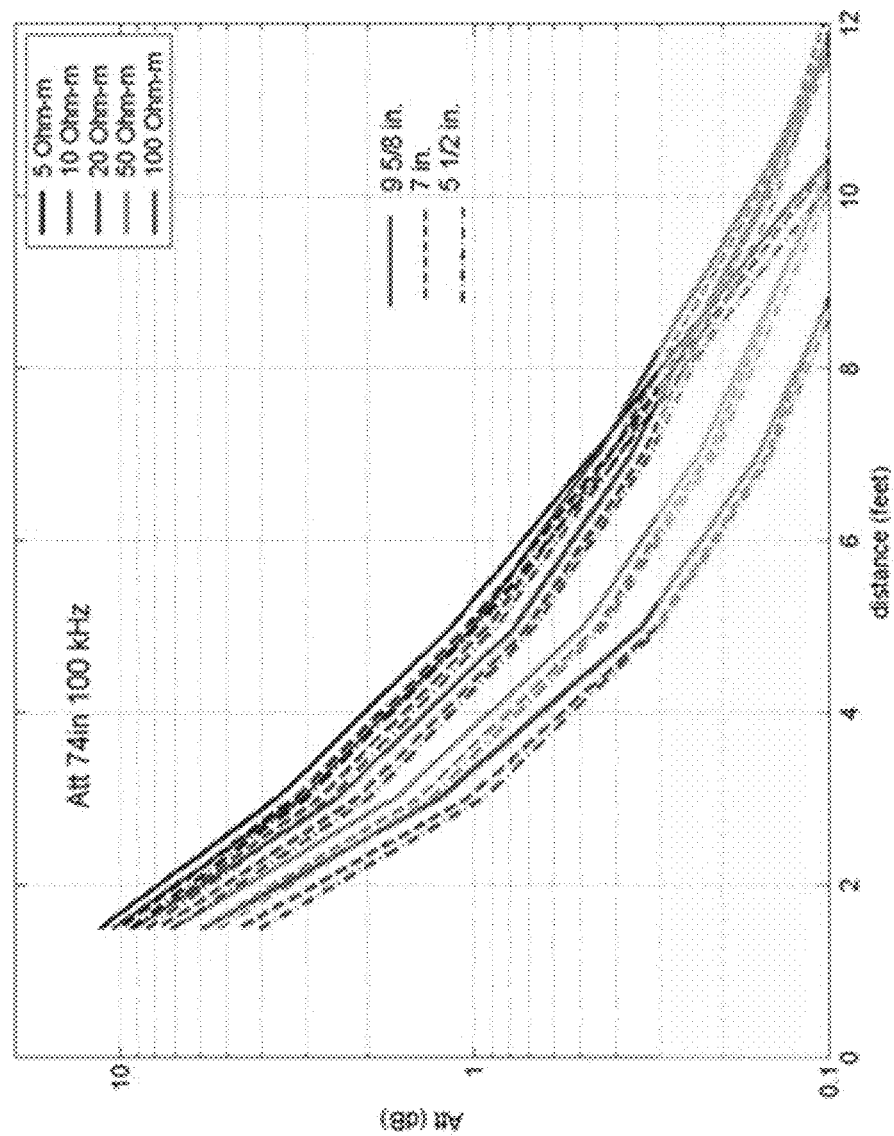
FIGS. 9-10 show sample resistivity logging tool 100 kHz second harmonic attenuation (CAD1) and phase shift (CPD1) responses to nearby casing as a function of distance for different background resistivity and different casing sizes.
Figure 10:
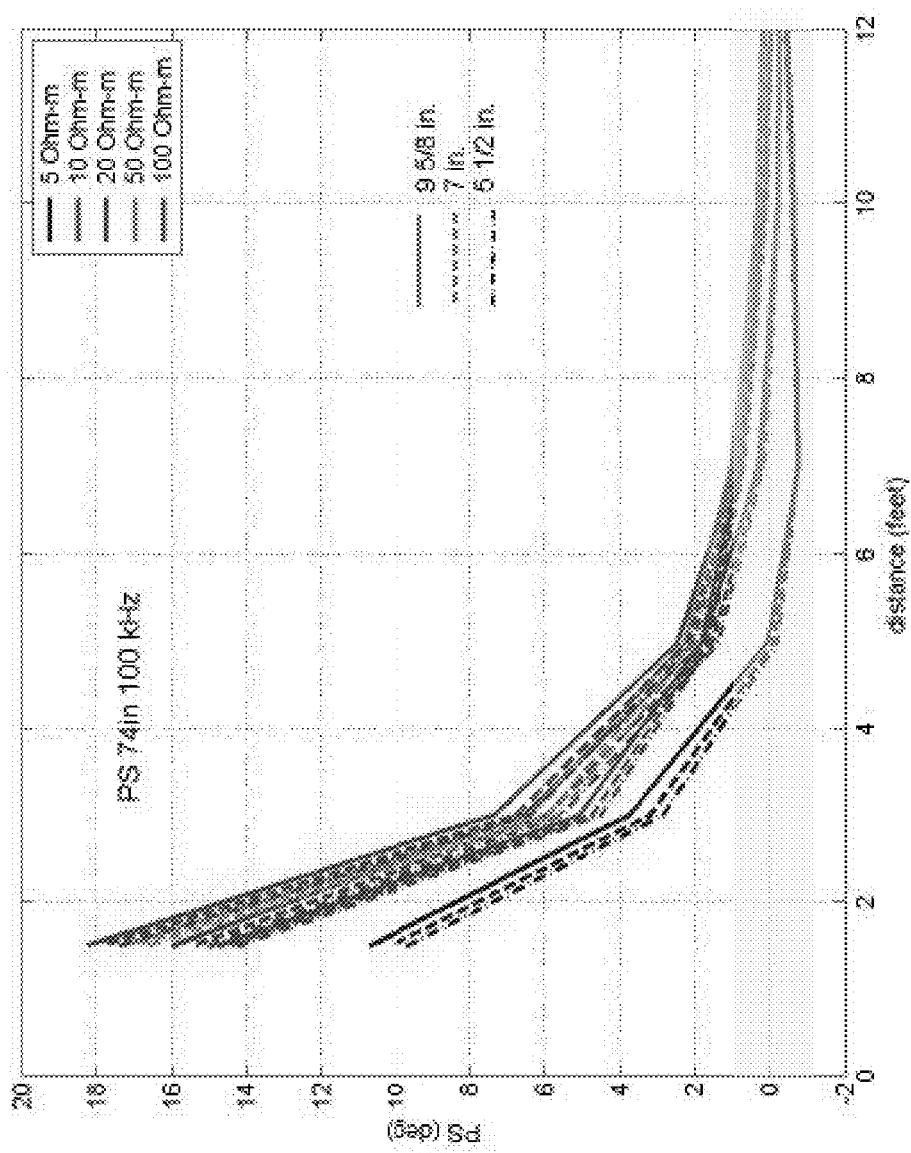

Illustrated in FIGS. 9-10 are 100 kHz second harmonic attenuation (CAD1) and phase shift (CPD1) responses to nearby casing as a function of distance for different background resistivity and different casing sizes. The response increases exponentially as the resistivity logging tool gets closer to the casing. If the signal detectability threshold is chosen to be 0.2 dB for CAD1 or 1 degree for CPD1, these measurement can detect the casing about 8 feet away with signal several time above the electronic noise level. These diagrams can be used to determine distance to casing while drilling. In addition mathematical inversion can be used to compute distance to casing from multiple measurements.

Figure 11:
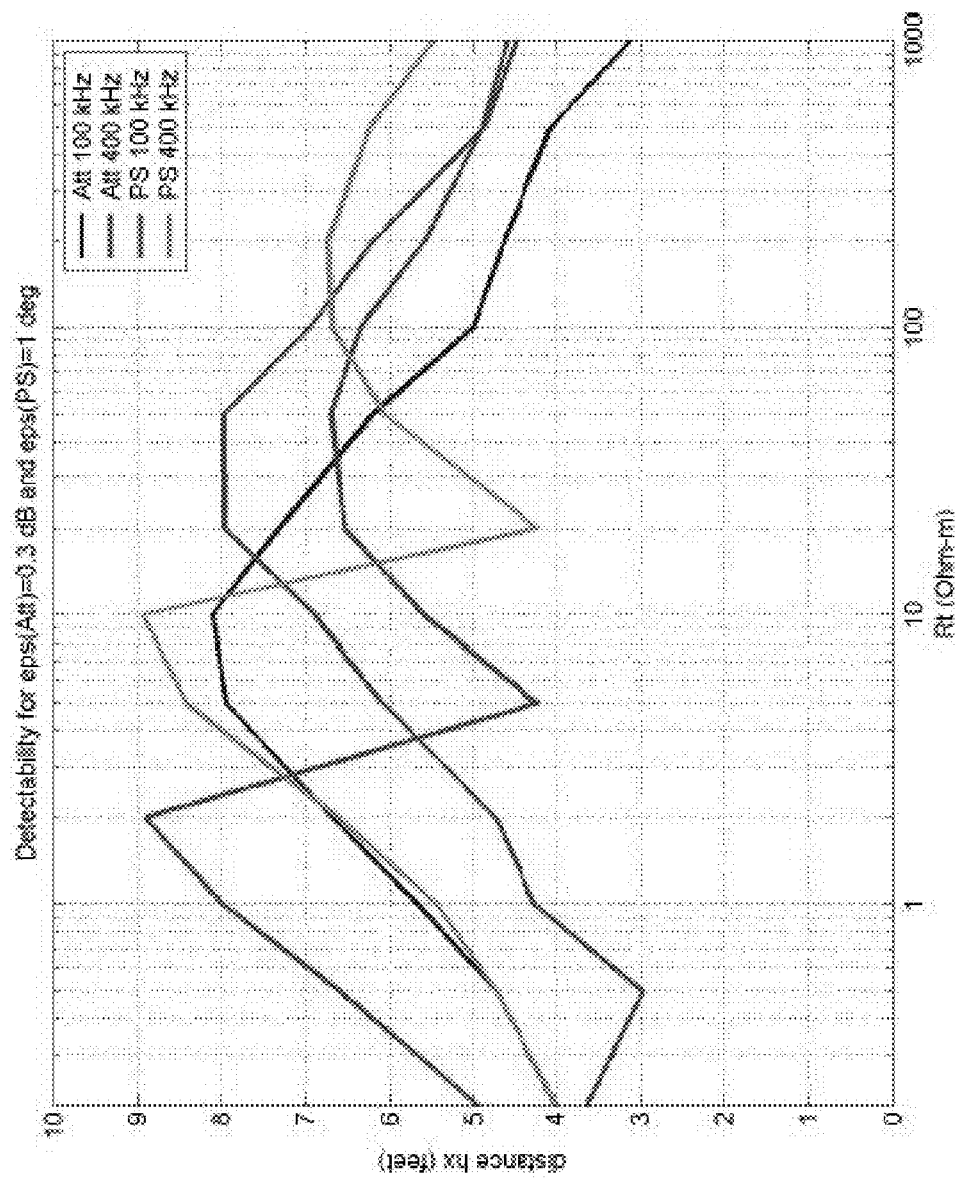
FIG. 11 illustrates the maximal distance where the second harmonic signal is above the detectability threshold.
Figure 12:
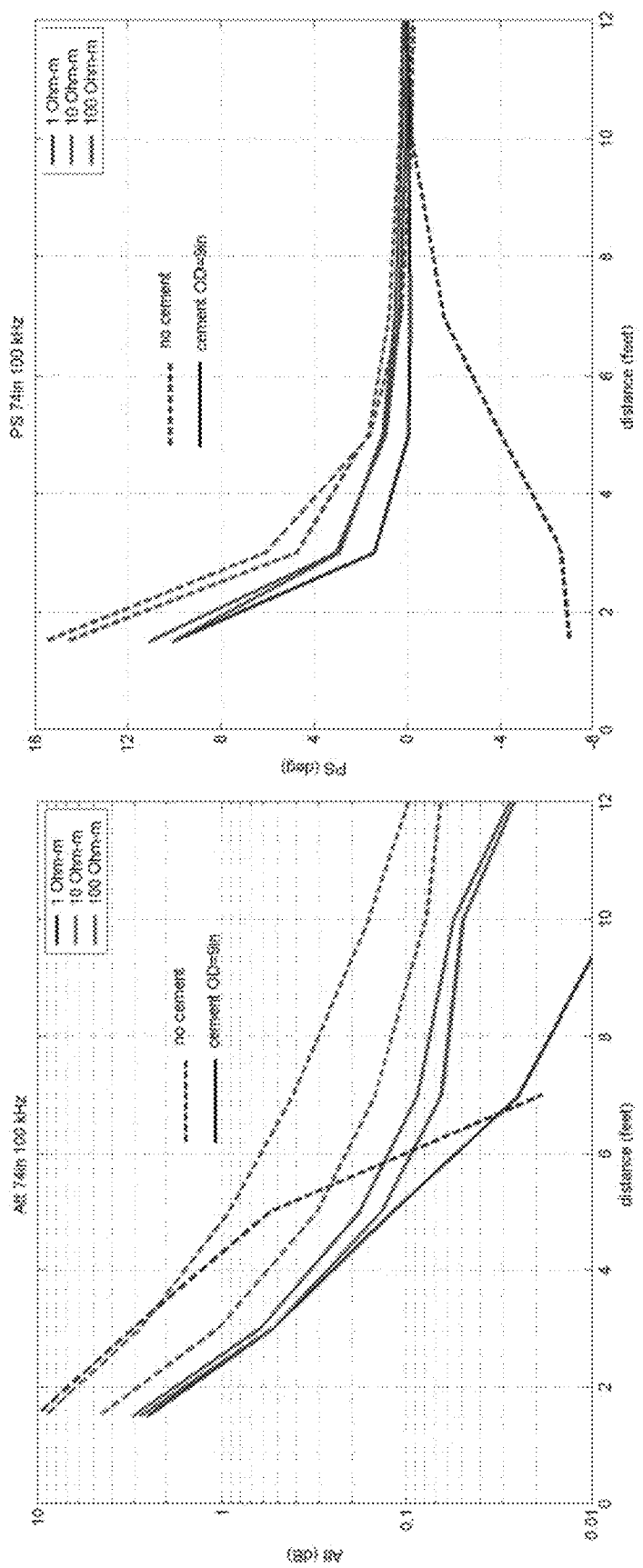
FIG. 12 illustrates the effect on the current closing through the casing that can affect the estimated distance if the casing is cemented.

Illustrated in FIG. 11 is the maximal distance where the second harmonic signal is above the detectability threshold of 0.3 dB and 1 degree for resistivity background from 0.1 Ohm-m to 1000 Ohm-m. If the casing is cemented, it affects the current closing through the casing and that can affect the estimated distance if not taken into account, as shown in FIG. 12.

Figure 13:
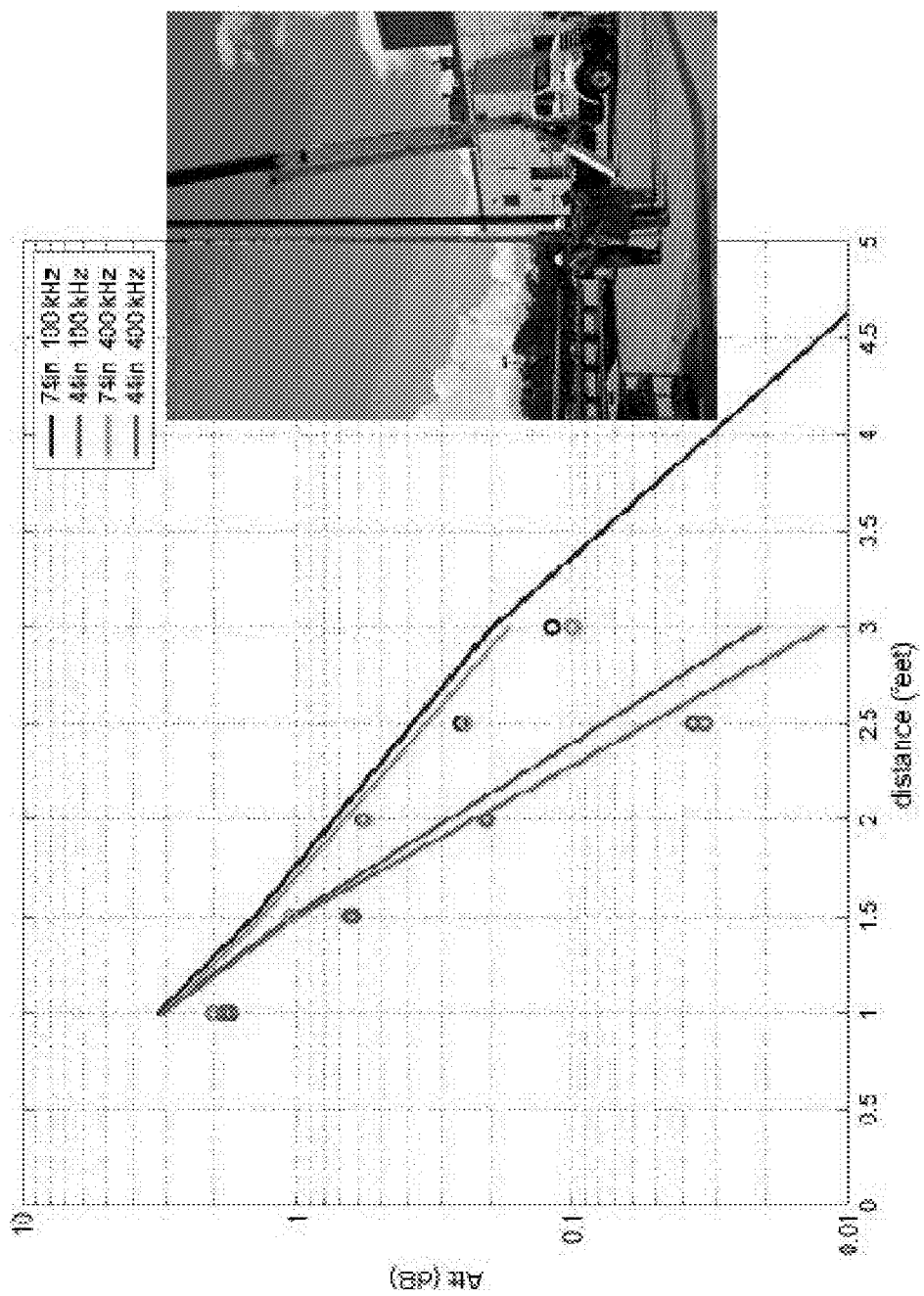
FIG. 13 illustrates experimental validation of responses compared to numerical simulation for 7 inch casing.
Figure 14:
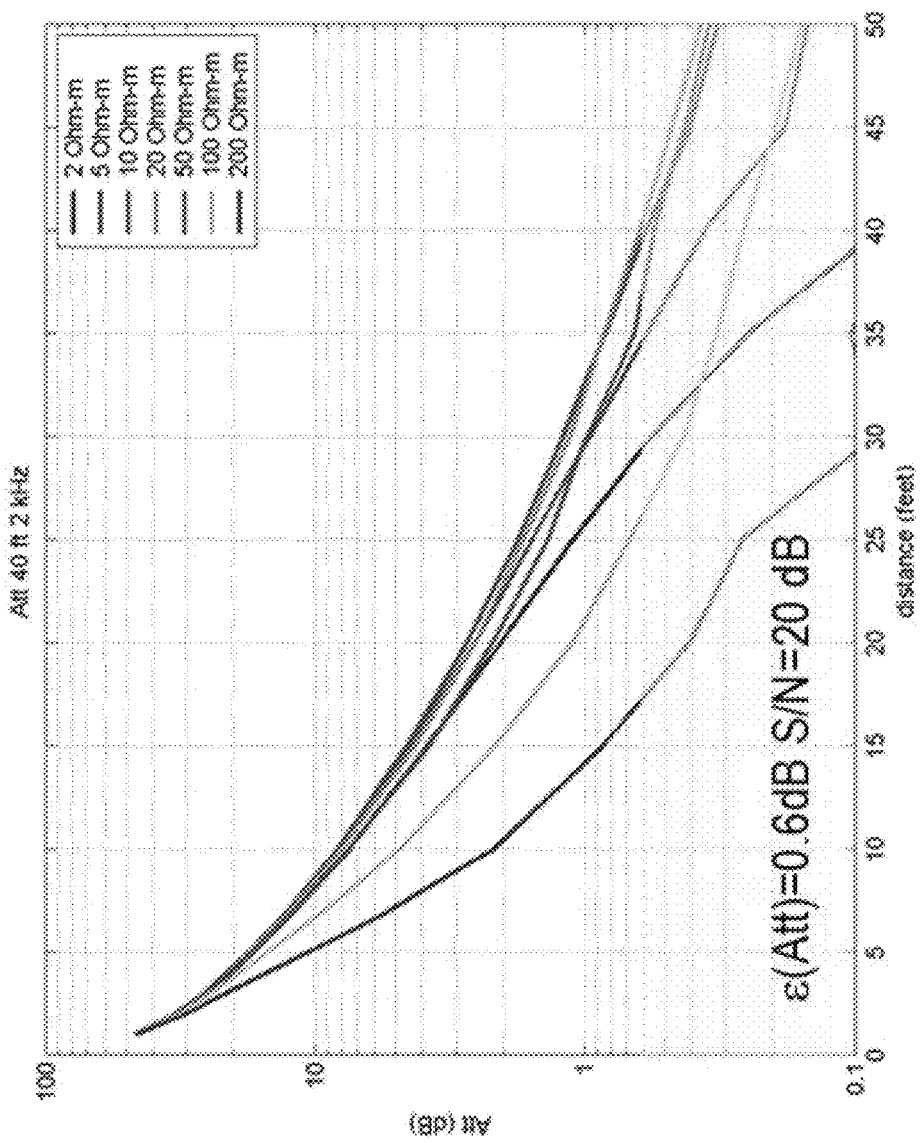
FIG. 14 shows 2 kHz second harmonic directional attenuation measurement response to 9 inch casing for a homogenous background.
Figure 15:
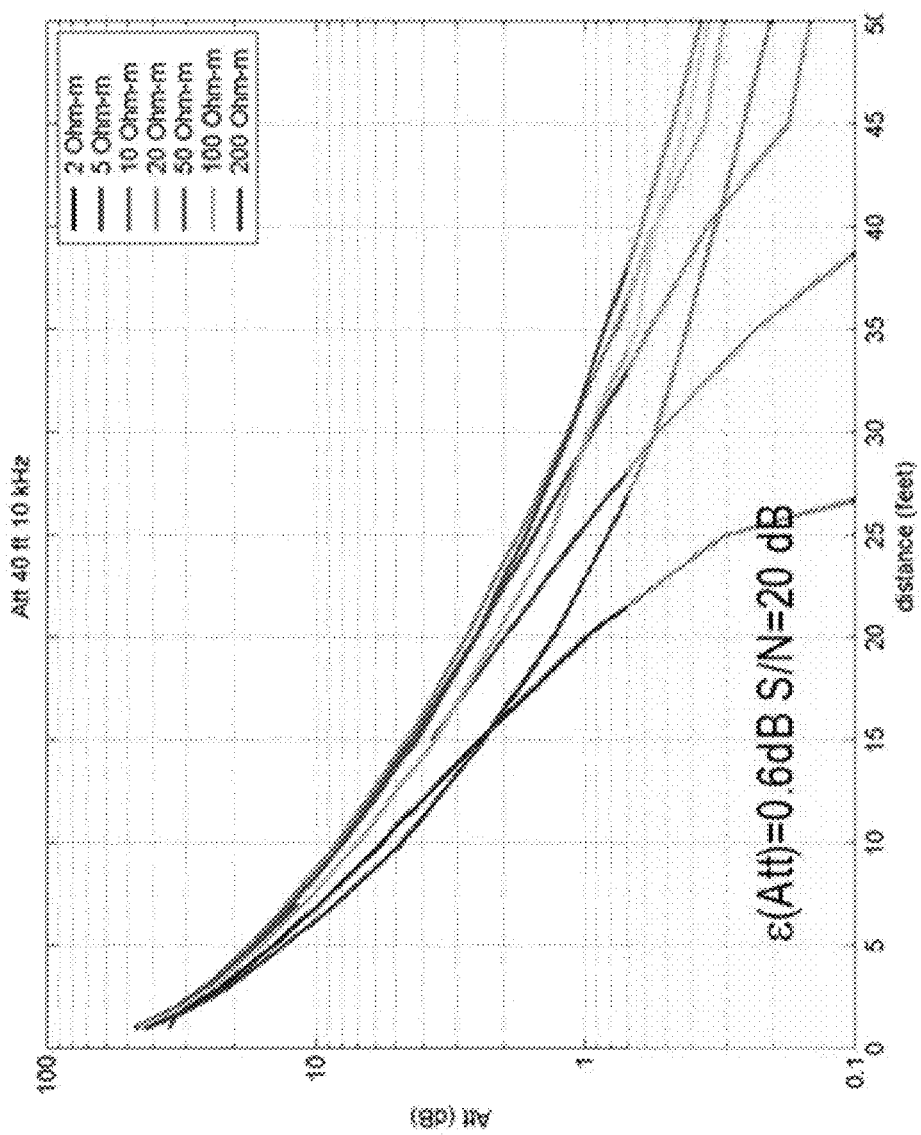
FIG. 15 shows 10 kHz 2nd harmonic directional attenuation measurement response to 9" casing for a homogenous background.
Figure 16:
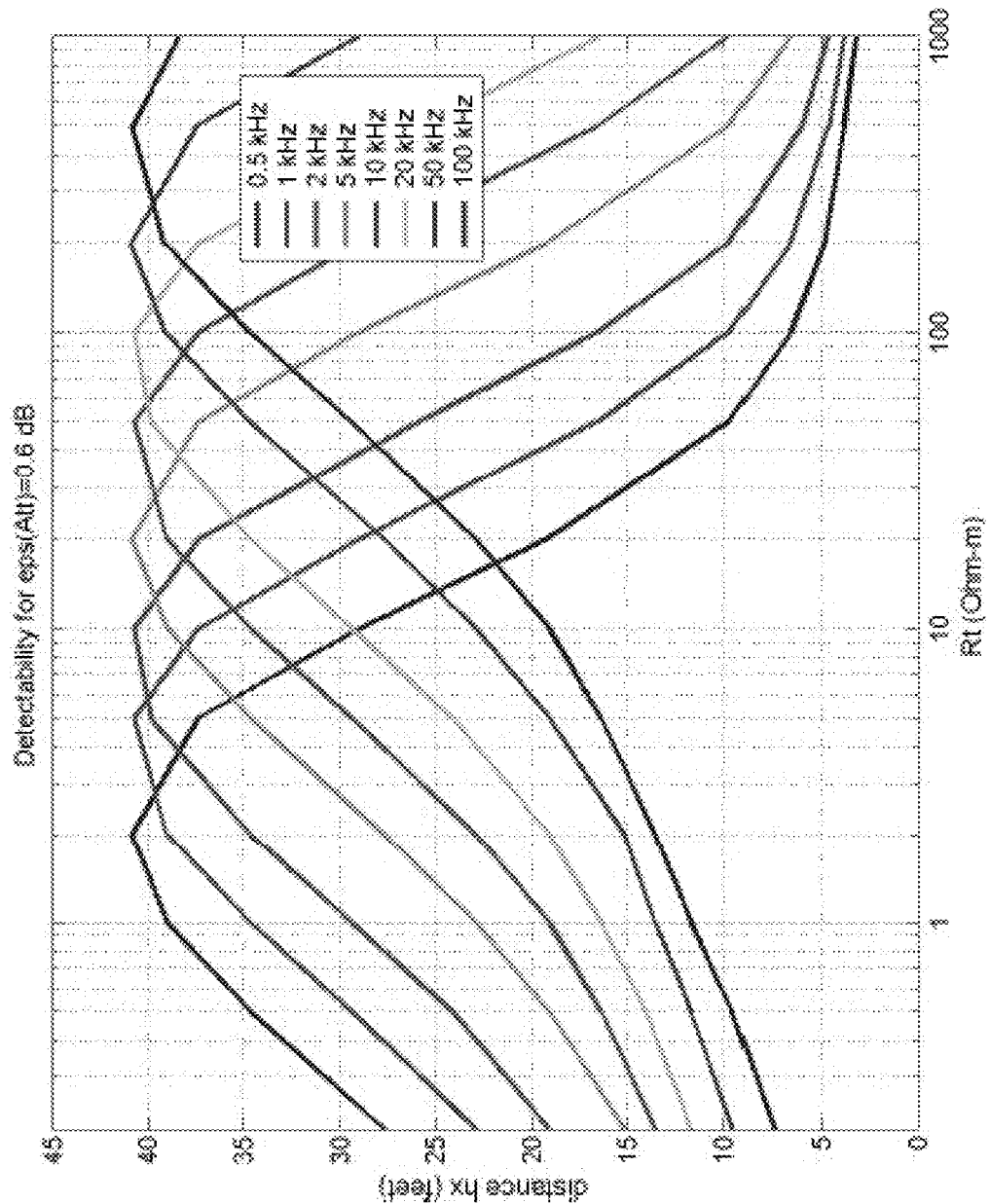
FIG. 16 shows $2^{nd}$ harmonic directional attenuation measurement detectability of 9" casing, using an SNR=20 dB criterion.

Shown in FIG. 13 is the experimental validation of responses compared to numerical simulation for 7 inch casing. Various responses were modeled. Directional attenuations (UHAA) $2^{nd}$ harmonic attenuation responses for spacing of 40 ft and frequencies 2 kHz and 10 kHz are shown in FIGS. 14 and 15, respectively. A casing detectability diagram can be derived for different resistivities and background resistivities as shown in FIG. 16.

Figure 17:
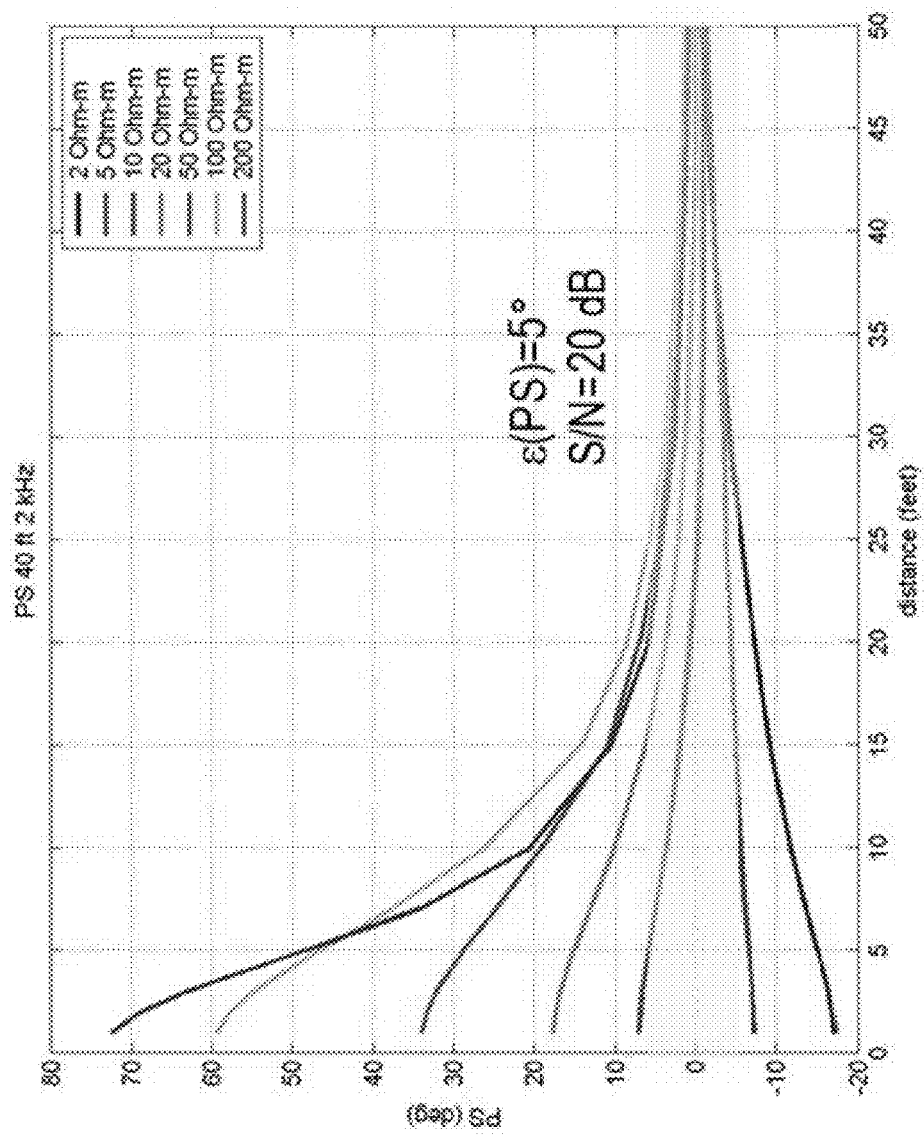
FIG. 17 shows 2 kHz second harmonic directional phase shift measurement response to 9 inch casing for a homogenous background.
Figure 18:
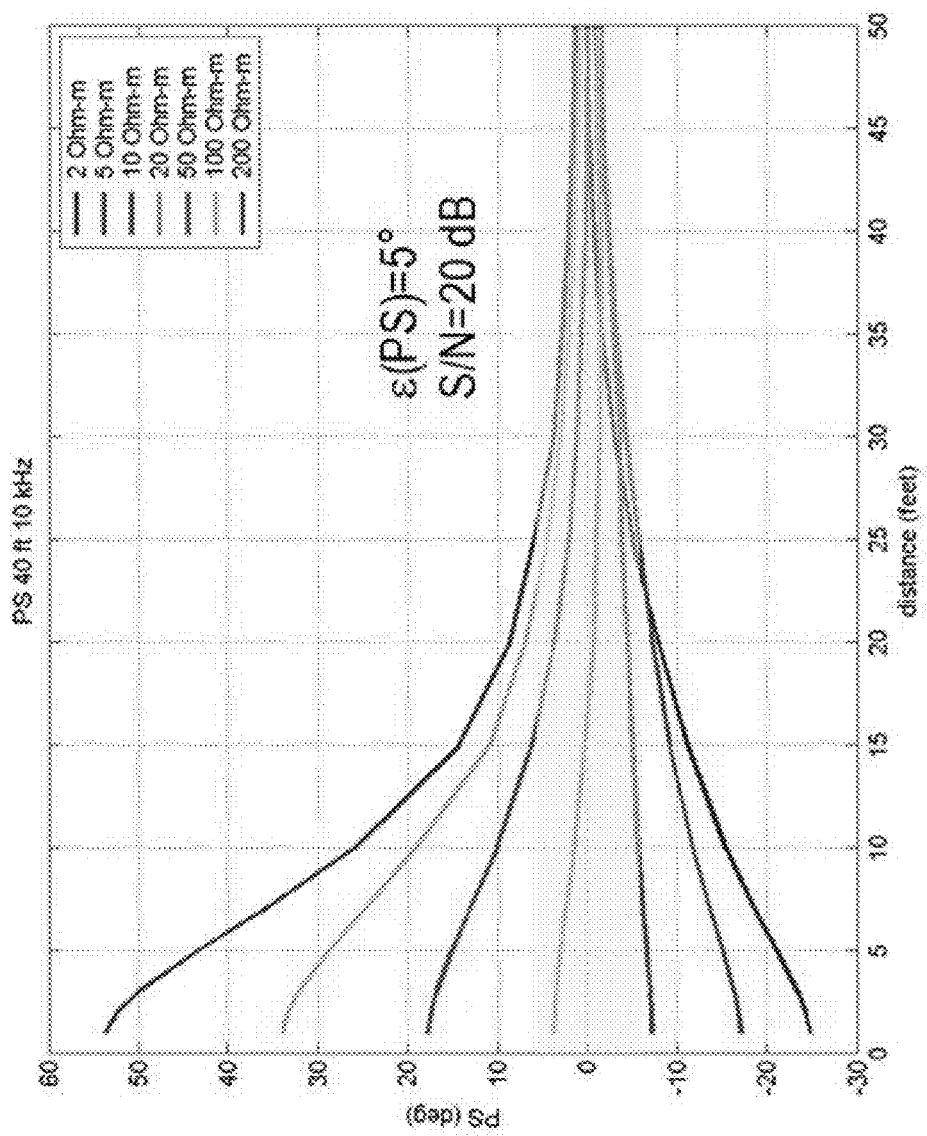
FIG. 18 shows 10 kHz second harmonic directional phase shift measurement response to 9 inch casing for a homogenous background.
Figure 19:
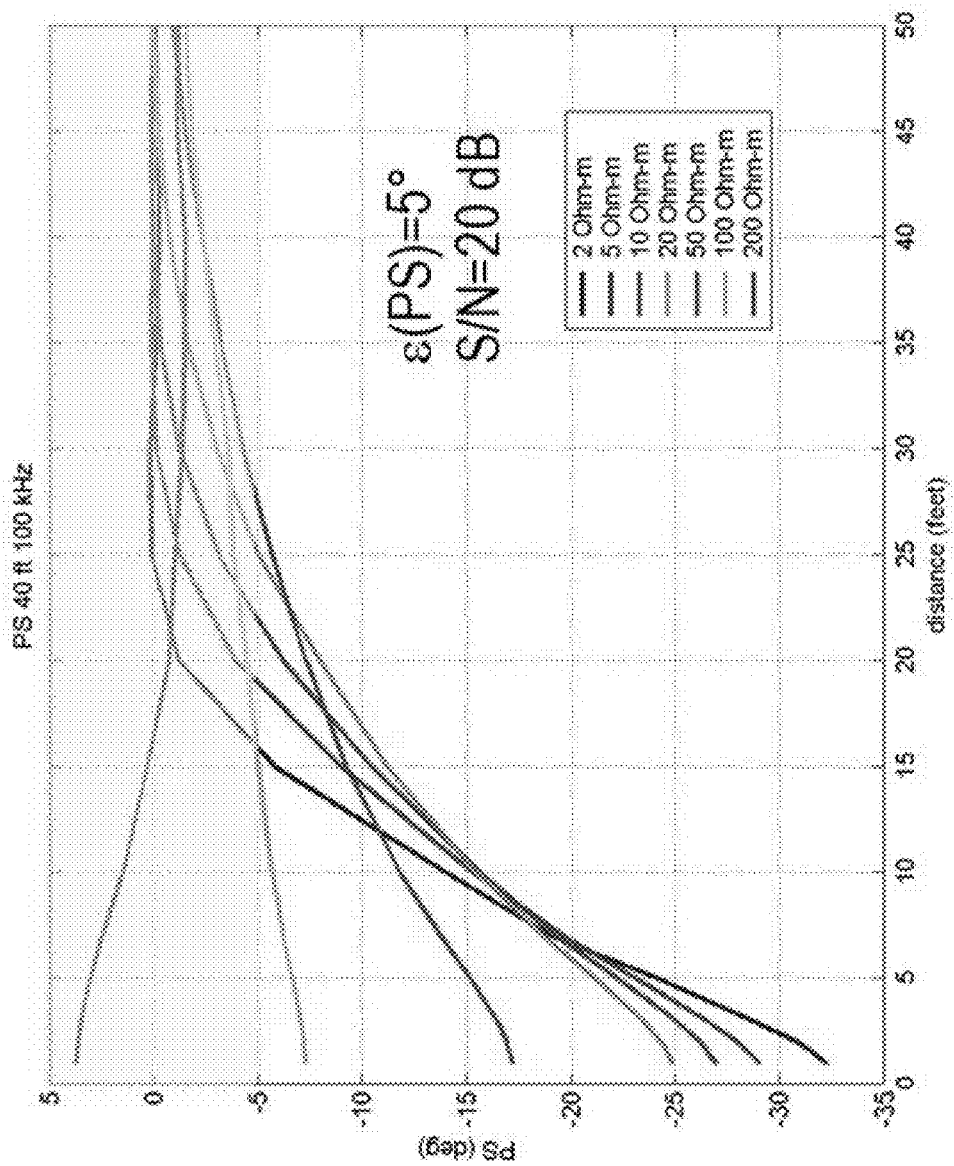
FIG. 19 shows 100 kHz second harmonic directional phase shift measurement response to 9 inch casing for a homogenous background.
Figure 20:
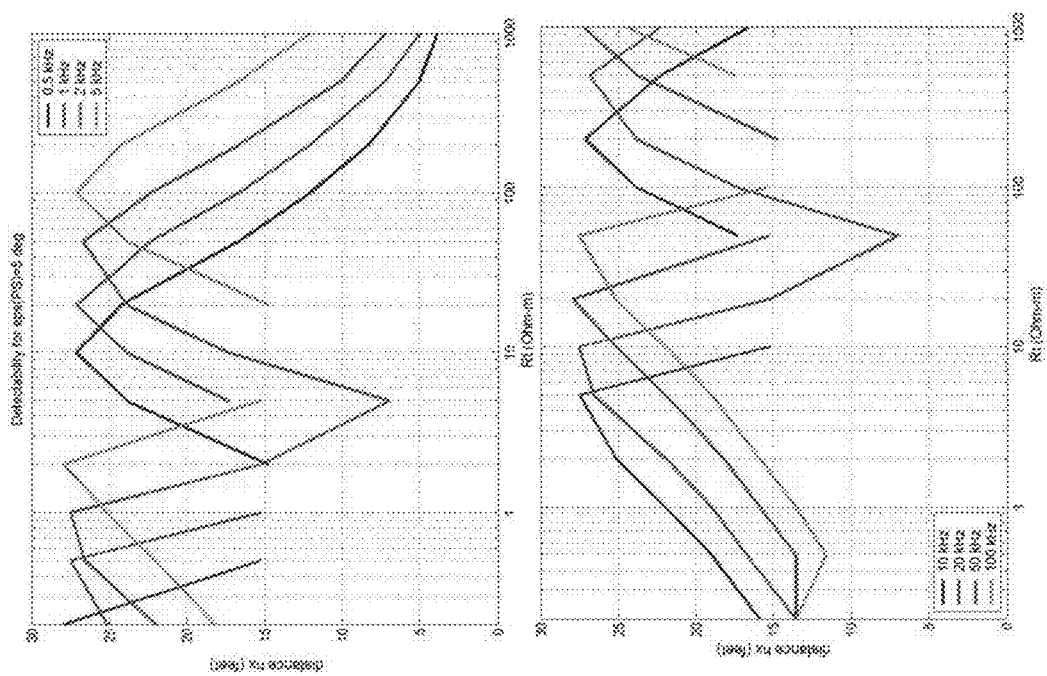
FIG. 20 shows phase shift detectability of 9 inch casing with the detectability criterion being S/N=20 dB.

Second harmonic phase shift responses (UHAP) for 40 ft spacings and frequencies 2 kHz, 10 kHz and 100 kHz are shown in FIGS. 17-19 respectively. As the frequency increases, the number of skin depths to the casing increase, and the tool shape of the response becomes more complex and non-monotonic. Casing detectability diagrams for different frequencies are shown in FIG. 20.

Figure 21:
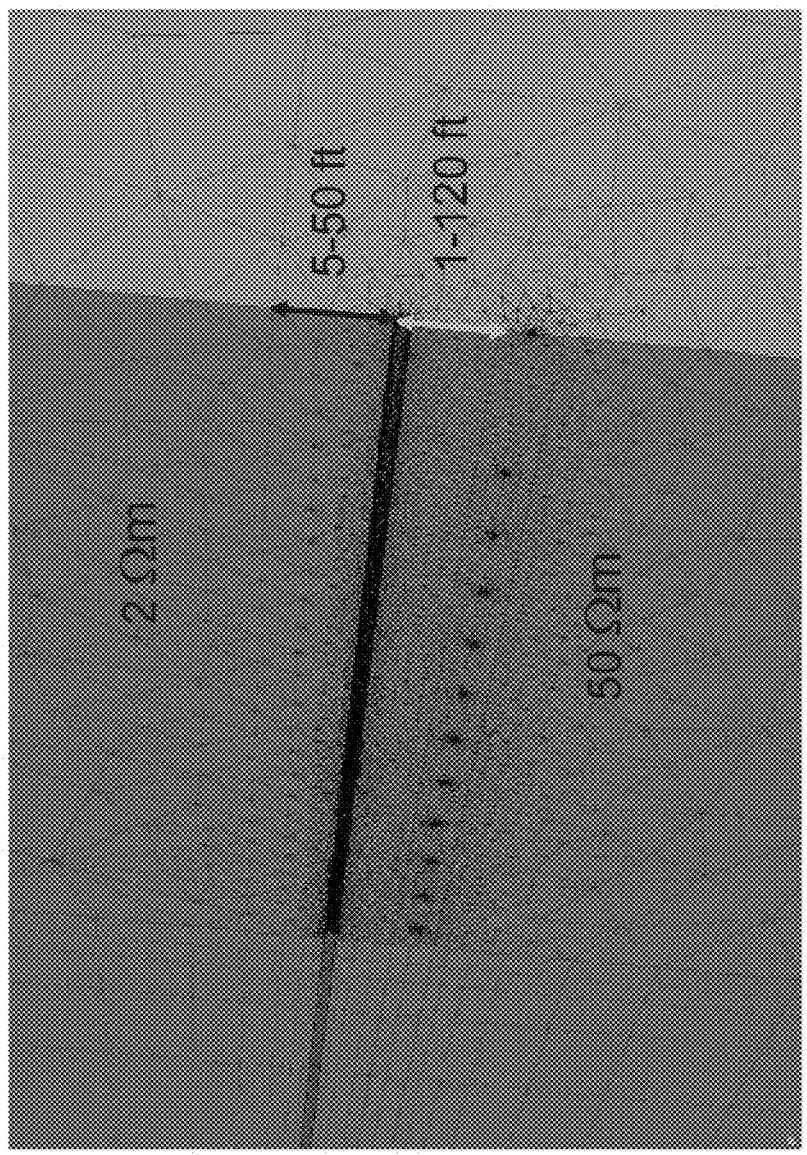
FIG. 21 shows deep directional measurement response to the casing with the presence of a nearby boundary above the casing.
Figure 22:
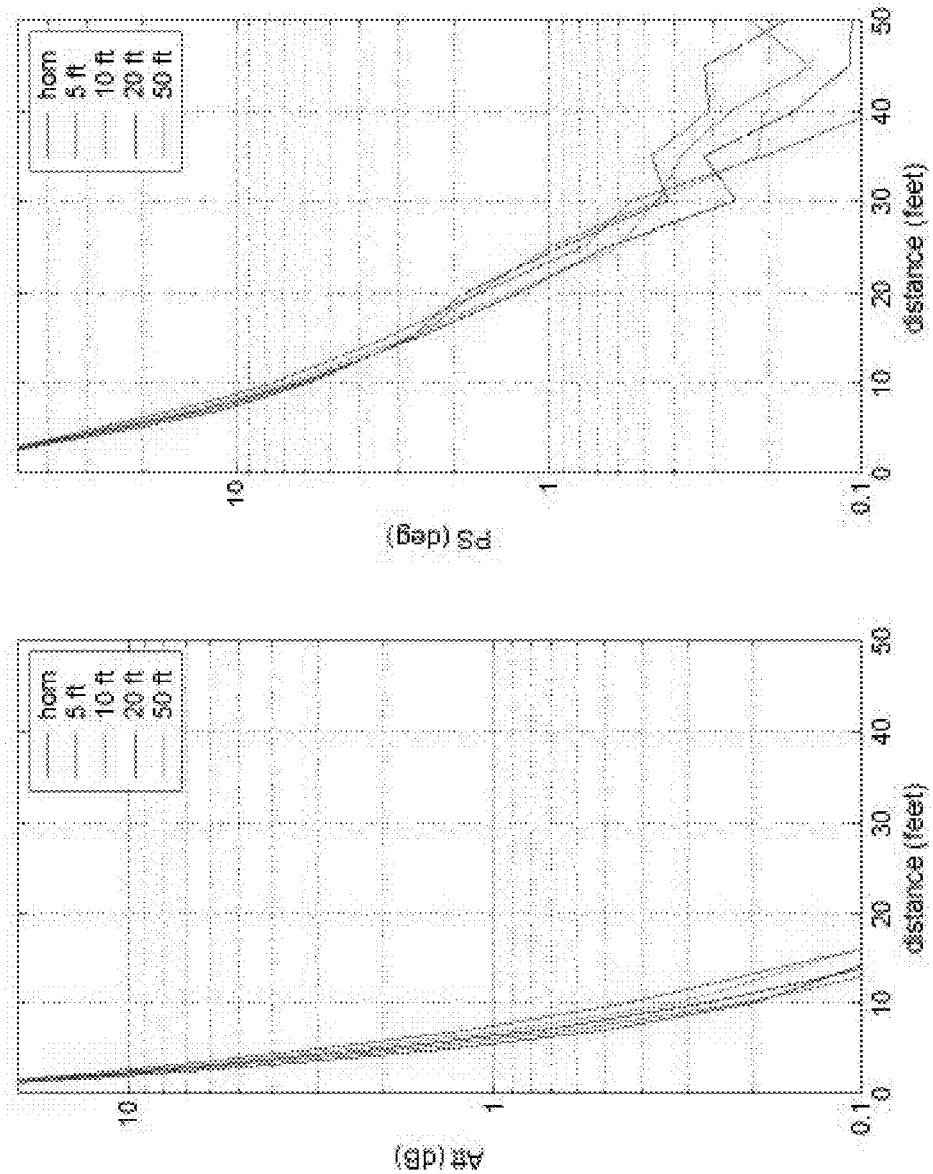
FIG. 22 shows 0.5 kHz directional attenuation and measurement responses to casing with the presence of a nearby boundary above the casing.

Influence of nearby boundaries at various distances from the casing was also simulated, as shown in FIG. 21. Computed responses for directional attenuations (UHAA) and phase shifts (UHAP) at frequencies 0.5 kHz, 2 kHz, 10 kHz and 100 kHz are shown in FIG. 20-23, respectively. One can note that, as the frequency increases, these responses are increasingly more sensitive to formation heterogeneity, and it is preferable to use low frequency responses that are primarily sensitive to nearby casing. Mathematical manipulations helpful in understanding and implementing the above may be found in U.S. Pat. No. 6,998,844, the entire contents which are hereby incorporated by reference.

Figure 24:
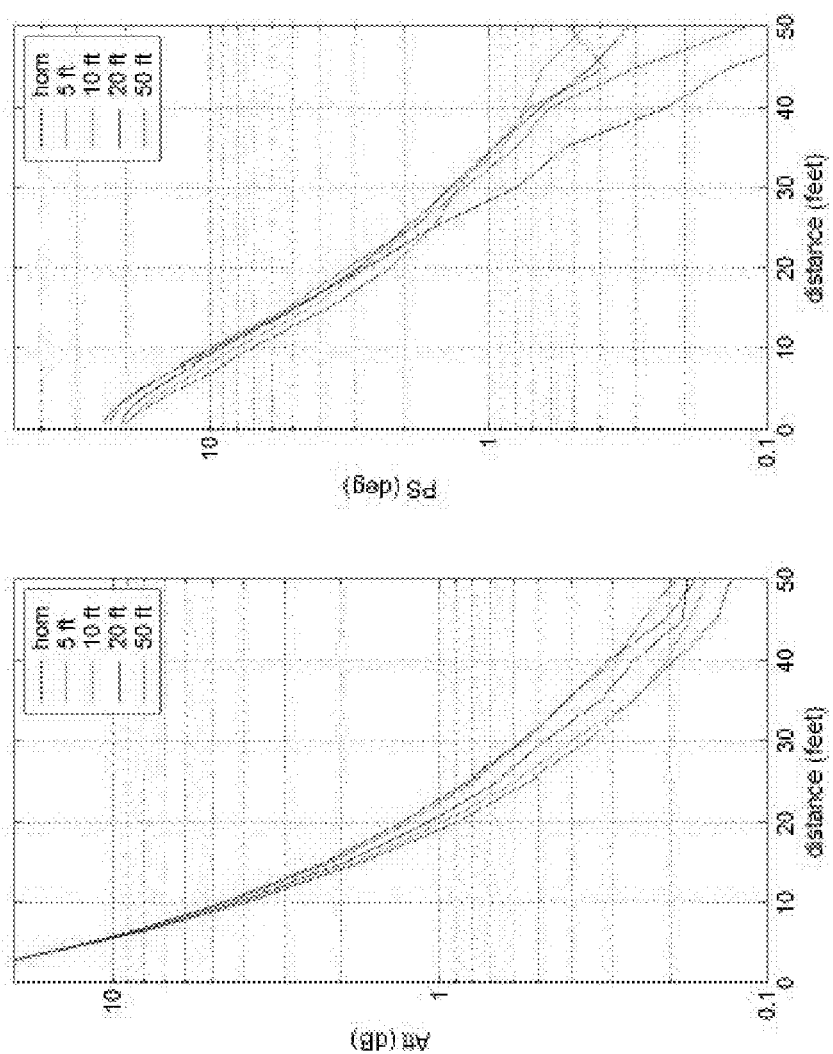
FIG. 24 shows 10 kHz directional attenuation and measurement responses to casing with the presence of a nearby boundary above the casing.
Figure 25:
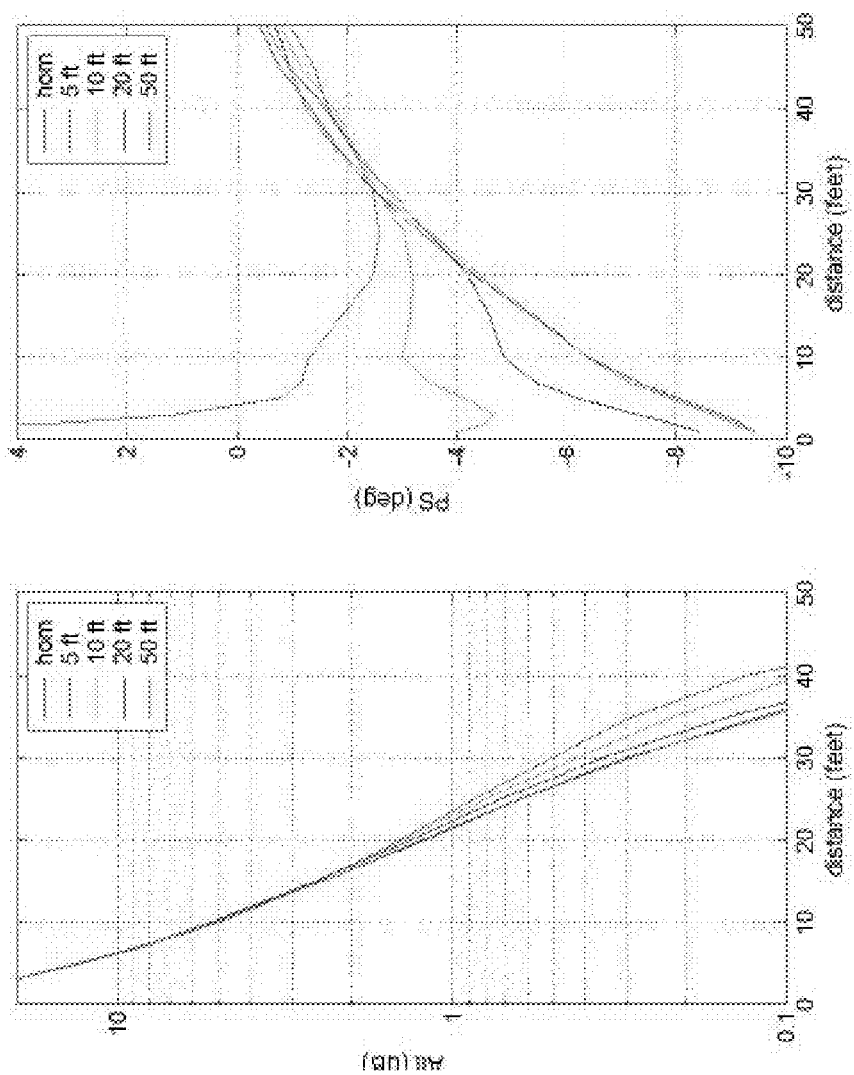
FIG. 25 shows a 100 kHz directional attenuation and measurement responses to casing with the presence of a nearby boundary above the casing.

Shown in FIG. 24 are 50 ft 10 kHz directional attenuation UHAA and UHAP measurement responses to casing with a presence of a nearby boundary above the casing. In addition, shown in FIG. 25 are 50 ft 100 kHz directional attenuation UHAA and UHAP measurement responses to casing with a presence of a nearby boundary above the casing.

Figure 26:
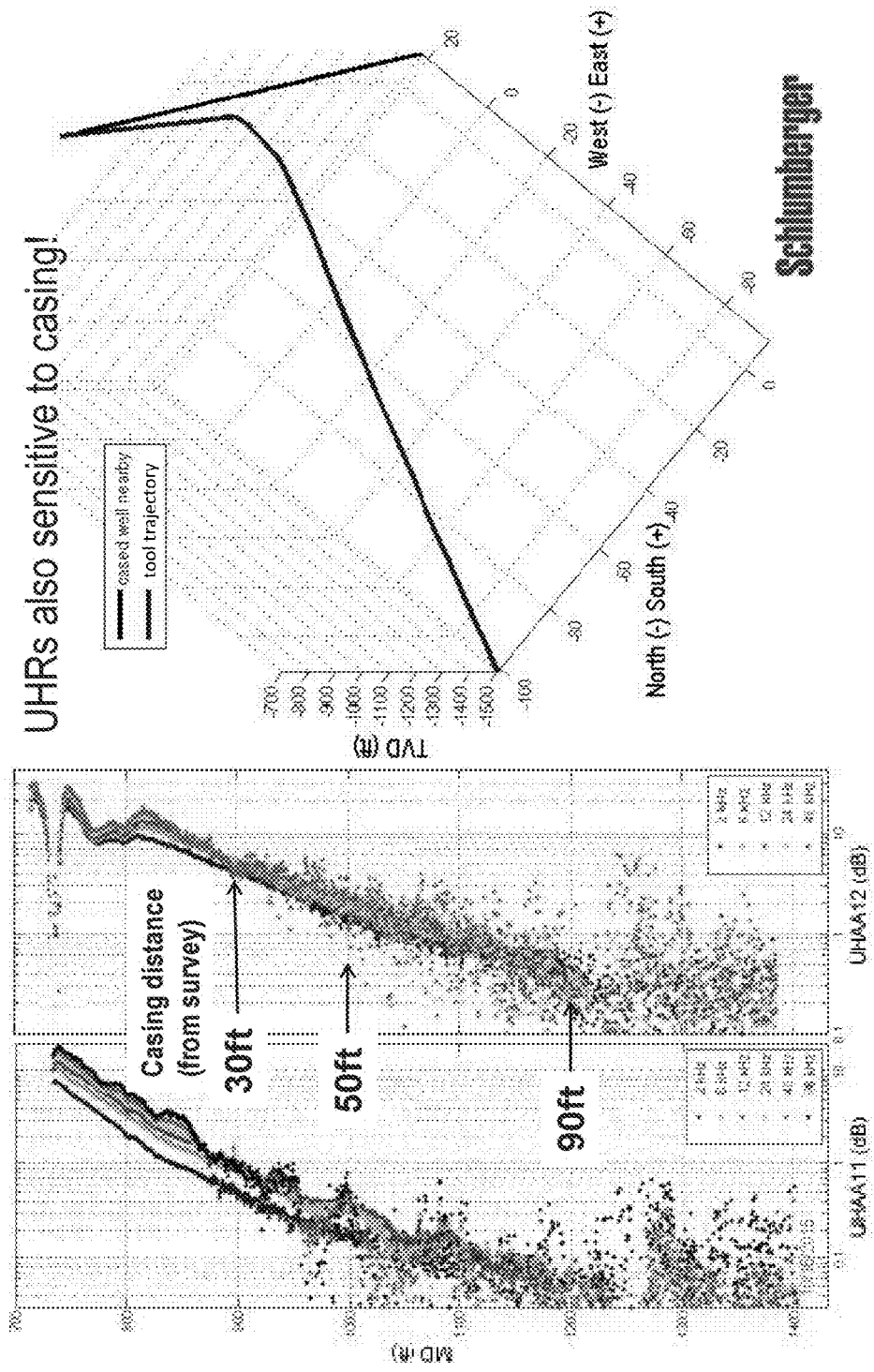
FIG. 26 shows a field example from a field test implementing the techniques described herein.

Response to casing has been measured confirming measurement sensitivity and exponential dependence of signal to distance to the casing, as shown in FIG. 26. Indeed, FIG. 26 shows a field example from a field test. The tool spacings are about 38 ft and 80 ft. The well inclination is gradually increasing to about 30°. The distances to nearby cased wells are derived based on the survey information.

The above techniques may be used in many applications. Such applications may include the use of second harmonic data and a resistivity measurement for a homogenous background to determine a distance to casing for a homogenous isotropic background. In addition, second harmonic data and multiple resistivity channels may be used for homogenous anisotropic background.

In addition, second harmonic data and symmetrized directional and resistivity channels may be used to generate a multilayer model from symmetrized and anti-symmetrized (first harmonic) directional and conventional resistivity channels. For a given background, the position of the casing may be determined using $2^{nd}$ harmonic channels. Further, inversion based on multiple second harmonic channels may be used.

As explained, the above techniques may be used for collision avoidance. Thus, the second harmonic data may be used in the proximity of multiple casing to define the range of signal for specified max allowed distances from nearby casings.

The signal may be monitored while drilling to determine possible zones and distances from multiple casings, and steering decisions may be made to keep the signal bellow the allowed threshold. Monitor the second harmonic signal and corresponding azimuth angle may be monitored, with the azimuth angle pointing to the side of closer casing.

The above techniques may also be used for drilling relief wells. Indeed, the second harmonic signal and azimuth may be used to determine the distance to and azimuth of the target well to be intercepted. The azimuth angle may be used to make the steering decision toward the target casing. When the angle is not changing while the $2^{nd}$ harmonic signal increases, the relief well is "on target". In the proximity of multiple casings, the range of signal for specified max allowed distances from nearby casings may be defined, and the signal may be monitored while drilling to determine possible zone and distance from multiple casing.

Although several example embodiments have been described in detail above, those skilled in the art will readily appreciate that many modifications are possible in the example embodiments without materially departing from the scope of this disclosure. Accordingly, all such modifications are intended to be included within the scope of this disclosure.

The invention claimed is:

1. A method of determining a relation between a resistivity logging tool and casing in an earth formation, the method comprising:
    acquiring coupling voltages, via an orientation of antennas, between different antenna components of different axes of a transmitting station transmitting into the earth formation and different antenna components of different axes of a receiving station receiving from the formation, using the resistivity logging tool wherein, due to the orientation of the antennas, the coupling voltages comprise second harmonic coupling voltages;
    extracting spatial Fourier coefficients from the coupling voltages versus tool face angles, using a computing device associated with the resistivity logging tool, wherein the spatial Fourier coefficients comprise coefficients for real and imaginary voltage components; and
    determining the relation between the resistivity logging tool and the casing as a function of the spatial Fourier coefficients and at least one resistivity measurement of the earth formation, using the computing device.

2. The method of claim 1, wherein the relation between the resistivity logging tool and the casing is determined by executing an inversion loop receiving the spatial Fourier coefficients and the at least one resistivity measurement as inputs.

3. The method of claim 1, further comprising drilling into a subsurface formation using a tool string including the resistivity logging tool;
    wherein the coupling voltages are acquired, the spatial Fourier coefficients are extracted, and the relation between the resistivity logging tool and the casing is determined during the drilling.

4. The method of claim 3, wherein the casing comprises multiple separate and spaced apart lengths of casing;
    further comprising determining an azimuth angle associated with the extracted spatial Fourier coefficients, using the computing device; and
    wherein the azimuth angle points toward which length of casing of the multiple separate and spaced apart lengths of casing is closer to the resistivity logging tool.

5. The method of claim 4, further comprising steering the tool string based upon the relation between the resistivity tool and the casing; and
    wherein the relation comprises a distance between the resistivity logging tool and the length of casing of the multiple separate and spaced apart lengths of casing that is closer to the resistivity logging tool.

6. The method of claim 4, further comprising steering the tool string based upon the azimuthal angle.

7. The method of claim 3, further comprising determining an azimuth angle associated with the extracted spatial Fourier coefficients, using the computing device;
    wherein the azimuth angle points toward the casing.

8. The method of claim 7, further comprising steering the tool string based upon the azimuthal angle.

9. The method of claim 8, further comprising determining that the tool string is on an intercept course with the casing when, over a period of time during the drilling, the azimuthal angle is unchanging but the coupling voltages increase.

10. The method of claim 1, further comprising generating a model of the earth formation as a function of symmetrized and anti-symmetrized directional measurements and the at least one resistivity measurement of the earth formation, using the computing device; and
wherein the relation between the resistivity logging tool and the casing is determined by fitting the spatial Fourier coefficients to the model.

11. The method of claim 1, wherein the relation between the resistivity logging tool and the casing comprises a distance therebetween.

12. The method of claim 1, wherein the earth formation is isotropic; and
wherein the at least one resistivity measurement comprises a single resistivity measurement.

13. The method of claim 1, further comprising drilling into a subsurface formation using a tool string including the resistivity logging tool;
wherein the coupling voltages are acquired, the spatial Fourier coefficients are extracted, and the relation between the resistivity logging tool and the casing is determined during the drilling; and
further comprising steering the tool string based upon the relation between the resistivity tool and the casing.

14. The method of claim 1, wherein the earth formation is anisotropic; and
wherein the at least one resistivity measurement comprises a plurality of resistivity measurements along different directions.

15. A well logging tool comprising:
a resistivity sub comprising:
at least one transmitter station comprising a plurality of transmission antenna components each corresponding to a different axis and transmitting into an earth formation;
at least one receiver station comprising a plurality of reception antenna components each corresponding to a different axis and receiving from the earth formation; and
a control apparatus for the resistivity sub configured to operate the resistivity sub so as to:
acquire coupling voltages, between the at least one transmitter station and the at least one receiver station, extract spatial Fourier coefficients from the coupling voltages wherein, due to an orientation of the plurality of transmission antenna components and the plurality of reception antenna components, the coupling voltages comprise second harmonic coupling voltages and wherein the spatial Fourier coefficients comprise coefficients for real and imaginary voltage components, and determine a relation between the resistivity sub and casing in the earth formation as a function of the spatial Fourier coefficients and at least one resistivity measurement of the earth formation.

16. The well logging tool of claim 15, wherein at least one antenna component of the at least one transmitter station comprises a tilted antenna component; and
wherein at least one antenna component of the at least one receiver station comprises a tilted antenna component in or nearly in a same plane as the tilted antenna component of the at least one transmitter station so as the response can be resolved into an measurement which has a second harmonic coefficient when fit to a Fourier expansion or fit.

17. The well logging tool of claim 15, wherein at least one antenna component of the at least one transmitter station comprises a tilted antenna component or an axial antenna component; and
wherein at least one antenna component of the at least one receiver station comprises a tilted antenna component or a transverse antenna component.

18. The well logging tool of claim 15, wherein the relation between the resistivity logging tool and the casing is determined by executing an inversion loop receiving the spatial Fourier coefficients and the at least one resistivity measurement as inputs.

19. The well logging tool of claim 15, wherein the control apparatus is further configured to operate the resistivity sub so as to generate a model of the earth formation as a function of symmetrized and anti-symmetrized directional measurements and the at least one resistivity measurement of the earth formation; and
wherein the relation between the resistivity logging tool and the casing is determined by fitting the spatial Fourier coefficients to the model.

20. The well logging tool of claim 15, wherein the well logging tool comprises a tensor resistivity tool conveyed on a wireline.

* * * * *